US012728071B2

(12) United States Patent
Wang

(10) Patent No.: US 12,728,071 B2
(45) Date of Patent: Sep. 8, 2026

(54) REMOTE COLLABORATIVE ROBOT ACUPUNCTURE SYSTEM

(71) Applicant: Junhao Wang, Hangzhou City (CN)

(72) Inventor: Junhao Wang, Hangzhou City (CN)

( * ) Notice: Subject to any disclaimer, the term of this patent is extended or adjusted under 35 U.S.C. 154(b) by 0 days.

(21) Appl. No.: 19/281,775

(22) Filed: Jul. 28, 2025

(65) Prior Publication Data

US 2025/0352429 A1 Nov. 20, 2025

Related U.S. Application Data

(63) Continuation of application No. PCT/CN2024/072581, filed on Jan. 16, 2024.

(30) Foreign Application Priority Data

Mar. 14, 2023 (CN) ......................... 202310242382.8

(51) Int. Cl.
*A61H 39/08* (2006.01)

(52) U.S. Cl.
CPC ..... *A61H 39/08* (2013.01); *A61H 2201/1215* (2013.01); *A61H 2201/123* (2013.01); *A61H 2201/1659* (2013.01); *A61H 2201/501* (2013.01); *A61H 2201/5043* (2013.01); *A61H 2201/5058* (2013.01)

(58) Field of Classification Search
CPC ............ A61H 39/08; A61H 2201/1215; A61H 2201/123; A61H 2201/1659; A61H 2201/501; A61H 2201/5043; A61H 2201/5058; A61H 2201/105; A61H 2201/1207; A61H 2201/1671; A61H 2201/5007; A61H 2201/5097
See application file for complete search history.

(56) References Cited

U.S. PATENT DOCUMENTS

2010/0262168 A1 10/2010 Khairkhahan et al.
2024/0058210 A1* 2/2024 Xiaofeng Nie ...... A61B 5/0036

FOREIGN PATENT DOCUMENTS

CN 211301135 U 8/2020
CN 112025705 A 12/2020

* cited by examiner

*Primary Examiner* — Katherine M Rodjom

(57) ABSTRACT

A remote collaborative robot acupuncture system includes an acupuncture robot and a remote operation terminal; the remote operation terminal and the acupuncture robot are connected by means of a network; the acupuncture robot comprises a multi-axis robotic arm, a monitoring module, and an acupuncture operation group; the monitoring module and the acupuncture operation group are both mounted on the multi-axis robotic arm; the multi-axis robotic arm operates the acupuncture operation group to move to an acupuncture site of a human body; the monitoring module is configured to capture images and perform monitoring in real time; the remote operation terminal comprises a teaching pendant, a display, and a controller; the teaching pendant and the multi-axis robotic arm have the same structure; the teaching pendant is operated in a network connection state, and the multi-axis robotic arm follows.

7 Claims, 36 Drawing Sheets

REMOTE COLLABORATIVE ROBOT ACUPUNCTURE SYSTEM

FIELD OF THE INVENTION

The present invention relates to the field of intelligent medical treatment, especially to a remote collaborative robot acupuncture system.

BACKGROUND OF THE INVENTION

At present, the degree of industrial intelligence is getting higher and higher. Under the concept of intelligent control, intelligent equipment is obviously superior to manual operation in terms of processing efficiency and processing accuracy. The concept of intelligence is also gradually popularized in medical equipment. Replacing some traditional treatment operation methods with artificial intelligence is a new direction currently being studied. In the field of acupuncture treatment, experienced medical personnel will perform acupuncture treatment on patients, firstly, they will use cotton balls to disinfect the parts that need acupuncture, and then insert the treatment needle into the human body. The fingers will continuously twist the needle to achieve the purpose of acupuncture treatment.

It is not difficult to find that acupuncture treatment relies too much on manual operation, which requires medical personnel to have rich acupuncture experience. At the same time, long-term acupuncture treatment consumes a lot of energy of medical personnel, which will have a significant impact on both treatment efficiency and acupuncture accuracy. Therefore, based on the concept of intelligence, it is very necessary to design devices or equipment that can assist medical personnel in acupuncture treatment.

SUMMARY OF THE INVENTION

To solve the problems existing in the prior art, the present invention provides a remote collaborative robot acupuncture system. By utilizing the system provided in this solution, the workload of medical personnel can be greatly reduced, and at the same time, it has a great promoting effect on ensuring treatment efficiency and acupuncture accuracy.

Specifically, the detailed technical solution provided by the present invention is as follows: a remote collaborative robot acupuncture system, comprising an acupuncture robot and a remote operation terminal, the acupuncture robot is used to perform acupuncture operations, the remote operation terminal is used for remote control, and the remote operation terminal and the acupuncture robot are connected via a network.

The acupuncture robot comprises a multi-axis mechanical arm, a monitoring module and an acupuncture operation group, wherein the monitoring module and the acupuncture operation group are both mounted on the multi-axis mechanical arm, and the multi-axis mechanical arm operates the acupuncture operation group to move to the acupuncture site of the human body, and the monitoring module is configured to capture images and conduct real-time monitoring.

The remote operation terminal includes a teaching pendant, a display and a manipulator. The teaching pendant has the same structure as the multi-axis robotic arm. When the teaching pendant is operated in a network connection state, the multi-axis robotic arm follows; the display is used to display images taken by the monitoring module, and the manipulator is configured to operate the acupuncture operation group actions.

Furthermore, the acupuncture operation group includes a support module, a disinfection module, a needle insertion module and a needle twisting module; the support module is fixed at the distal end of the multi-axis robotic arm; the disinfection module, the needle insertion module and the needle twisting module are fixed on the support module side by side in sequence; the multi-axis robotic arm drives the support module, thereby allowing the disinfection module, the needle insertion module and the needle twisting module to be adjusted in space.

Further, the support module includes a fixing plate, a linear motor module and a support plate; the fixing plate is connected to the distal end of the multi-axis robot; the linear motor module is fixed to the end surface of the fixing plate away from the multi-axis robot, and the support plate is fixed to a slider of the linear motor module; the motor in the linear motor module drives the slider to slide linearly left and right.

The disinfection module, the needle insertion module and the needle twisting module are all fixed on the end surface of the bracket plate away from the linear motor module.

Furthermore, the disinfection module includes an eccentric drive component, a disinfection propulsion component and a cotton swab storage component. The eccentric drive component is fixed to the bracket plate through a first support frame; the disinfection propulsion component is fixed to the eccentric drive component; the cotton swab storage component is built with a cotton swab, and the cotton swab is arranged in front of the disinfection propulsion component.

The disinfection propulsion component drives the cotton swab to extend straightly to contact the acupuncture area of the human body. The eccentric driving component is configured to drive the disinfection propulsion component and the cotton swab storage component to rotate eccentrically to disinfect the acupuncture area of the human body.

Furthermore, the cotton swab storage component also includes a cotton swab rotating wheel, wherein the cotton swab rotating wheel has a plurality of cotton swab storage cavities, and each of the cotton swab storage cavities accommodates a cotton swab.

The disinfection pushing component has a telescopic cotton swab push rod, and each extension of the cotton swab push rod pushes out the cotton swabs in different cotton swab storage cavities until they come into contact with the acupuncture area of the human body.

Furthermore, the needle insertion module includes a second support component, an acupuncture propulsion component and a needle.

The second support component has a second support frame, the second support frame is fixed on the support plate, the acupuncture propulsion component is installed in the second support component; the acupuncture needle is arranged in front of the acupuncture propulsion component.

The acupuncture propulsion component drives the needle to extend straightly so as to pierce the acupuncture site of the human body.

Furthermore, the needle insertion module further comprises a needle rotating wheel, wherein the needle rotating wheel has a plurality of needle storage cavities, and each of the needle storage cavities accommodates a needle.

The acupuncture propulsion component has a telescopic needle push rod, and each extension of the needle push rod pushes out the needles in different needle storage cavities to be inserted into the human body.

Furthermore, the needle twisting module includes a third supporting component, an alignment advancing component and a rotating clamping component.

The third support component has a third support frame, the third support frame is fixed to the support plate, the alignment propulsion component is installed in the third support component, and the rotating clamping component is connected to the front of the alignment propulsion component.

The alignment propulsion component drives the rotating clamping component to extend linearly to a preset position, and the rotating clamping component clamps the needle and rotates.

Furthermore, the rotating clamping component includes a stabilizing clamping portion, a rotating tightening portion and a rotating motor.

The rotating motor is fixedly connected to the front of the alignment propulsion component, and the rotating tightening part is fixedly connected to the output shaft of the rotating motor; the stabilizing clamping part is arranged in front of the rotating tightening part.

The stabilizing clamping part is configured to initially clamp the needle located on the human body; the positioning propulsion component drives the rotating tightening part to move forward in a straight line, and under the drive of the rotating motor, the rotating tightening part clamps the needle; after the stabilizing clamping part releases the needle, the rotating motor drives the rotating tightening part to continue rotating to achieve the needle twisting operation.

Furthermore, the monitoring module includes a first monitor and a second monitor; the first monitor is installed on the multi-axis robotic arm, and the first monitor is configured to monitor the movement state of the acupuncture operation group; the second monitor is installed on the acupuncture operation group, and the second monitor is configured to capture the acupuncture site on the human body.

The beneficial effects achieved by adopting this technical solution are as follows: in this solution, by remote control, with the cooperation of the monitoring module, the teaching pendant is controlled to make the multi-axis robot arm move synchronously; it can be close to or away from the human body; then the manipulator controls the acupuncture operation group here to move to complete the acupuncture operation on the human body. The cotton ball disinfection, treatment needle insertion and needle twisting required in the acupuncture process are all completed in sequence through the structure of the acupuncture operation group, realizing the practical application of intelligence, which has a great guarantee effect on reducing the labor intensity of medical personnel, improving the efficiency of acupuncture treatment, and improving the insertion accuracy of treatment needles. At the same time, remote acupuncture is a support for hospitals in remote areas. In some remote areas, there is a shortage of experienced acupuncturests. The remote collaborative robot acupuncture system of this solution can achieve remote help; furthermore, the remote collaborative robot acupuncture system can separate acupuncturests from patients to avoid the spread of diseases; of course, this system can also be used for remote treatment of dangerous animals.

Figure 1:
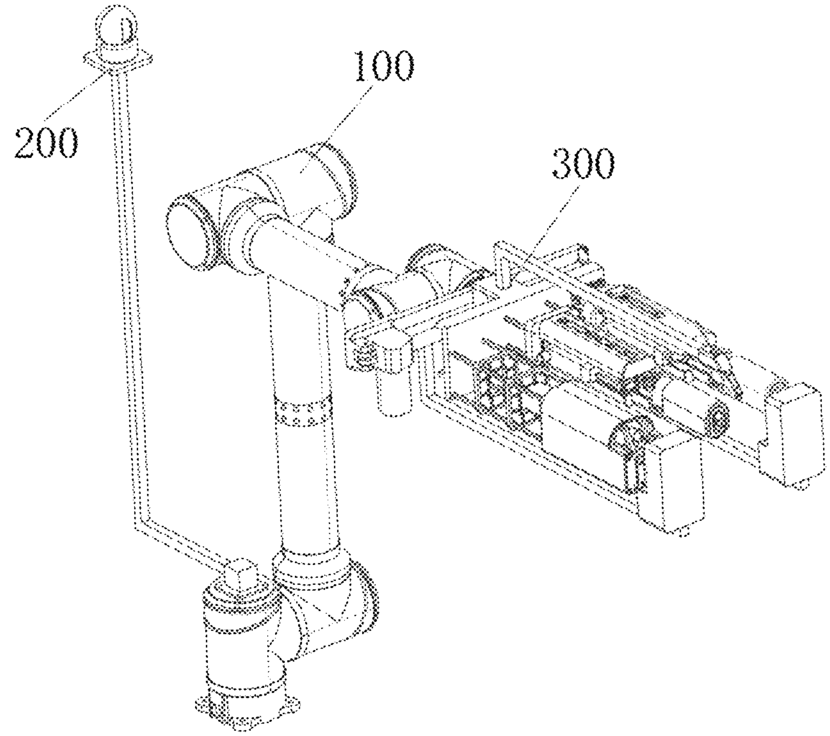
FIG. 1 is a schematic structural view of an acupuncture robot according to the present embodiment.

Labels in the drawing: 100 multi-axis robot arm, 200 monitoring module, 210 first monitor, 220 second monitor, 300 acupuncture operation group, 310 bracket module, 311 fixing plate, 312 linear motor module, 313 bracket plate, 314 storage box, 315 first connecting rod, 316 second connecting rod, 320 disinfection module, 321 first support component, 3211 first support frame, 322 eccentric drive component, 3221 eccentric motor, 323 disinfection propulsion component, 3231 end panel, 3232 first housing, 3233 first sliding seat body, 3234 first cotton swab pusher, 3235 second cotton swab pusher, 3236 cotton swab push rod, 3237 mounting block, 3238 electronic ruler, 324 cotton swab, 325 cotton swab reserve component, 3251 cotton swab storage rotating wheel, 3251-1 cotton swab storage chamber, 3251-2 first guide slide, 3251-3 second guide slide, 3252 toggle rod, 3253 toggle column, 3254 reserve shell, 3255 toggle slider, 3256 wheel chuck, 3257 docking chuck, 3258 spring, 3259 threaded adjustment rod, 330 needle insertion module, 331 second support component, 3311 second support frame, 332 acupuncture propulsion component, 3321 fastening plate, 3322 second housing, 3323 second sliding seat body, 3324 first needle pusher, 3325 second needle pusher, 3326 needle push rod, 3327 limit block, 3328 limit driver, 3329 measuring ruler, 333 needle, 334 needle reserve component, 3341 needle storage rotating wheel, 3341-1 needle storage cavity, 3342 toggle body, 3343 pin, 3344 box body, 3345 slider, 340 needle twisting module, 341 third support component, 3411 third support frame, 342 alignment propulsion component, 3421 first linear propulsion source, 3422 third shell, 3423 third sliding seat body, 343 rotating clamping component, 3431 rotating motor, 3432 rotating tightening part, 3433 first clamping member, 3434 second linear propulsion source, 3435 stabilizing clamping part, **3233*a* slide groove, 3422*a* slide groove, 3423*a* slide rail, 3256*a* first tooth surface, 3257*a* second tooth surface, 3250 mounting seat, 3325*a* stopper, first chamber 3341*a*, second chamber 3341*b*; 3322*a* slide rail; 312*a* motor, 312*b* slider, 312*c*** slide rail.

DETAILED DESCRIPTION

The principles and features of the present invention are described below in conjunction with the accompanying drawings. The examples given are only used to explain the present invention and are not used to limit the scope of the present invention.

This embodiment provides a remote collaborative robot acupuncture system, which can achieve acupuncture treatment for patients by remote control. At the same time, the remote collaborative robot acupuncture system in this solution has greatly improved the accuracy and efficiency of acupuncture treatment compared to current manual acupuncture.

Specifically, the remote collaborative robot acupuncture system provided in this solution includes an acupuncture robot and a remote operation terminal.

The acupuncture robot is used to perform acupuncture operations, the remote operation terminal is used for remote control, and the remote operation terminal and the acupuncture robot are connected through a network; it can be understood that the remote operation terminal is used to remotely control the acupuncture robot, so that the acupuncture robot can accurately perform acupuncture treatment on patients under human control.

By adopting intelligent remote control methods, not only the labor intensity of medical staff is greatly reduced, but also the risk of infection caused by contact between patients and medical staff during acupuncture treatment is reduced.

Figure 36:
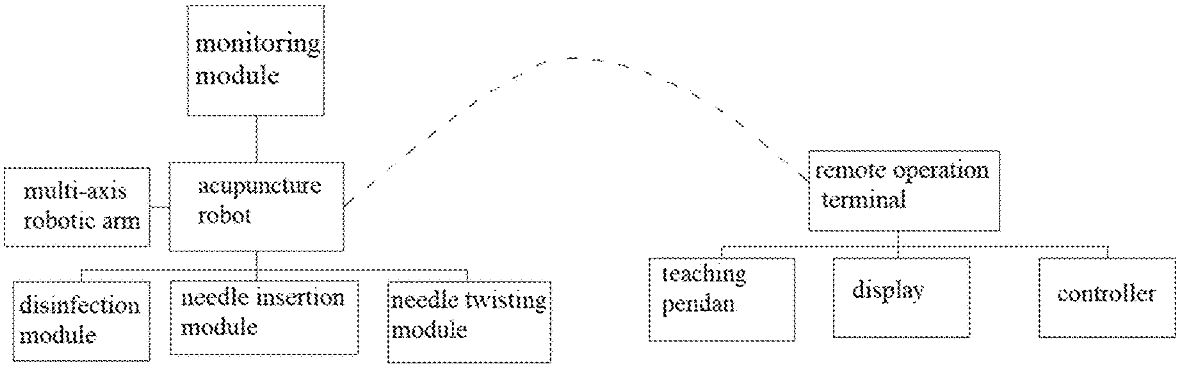
FIG. 36 shows a control principle diagram of remote collaboration.

In a specific embodiment of the present scheme, referring to FIG. 1 and FIG. 36, the acupuncture robot comprises a multi-axis robotic arm 100, a monitoring module 200 and an acupuncture operation group 300, wherein the monitoring module 200 and the acupuncture operation group are both mounted on the multi-axis robotic arm 100, the multi-axis robotic arm 100 operates the acupuncture operation group 300 to move to an acupuncture site of the human body (patient), and the monitoring module 200 is configured to capture images and monitor in real time; the remote operation terminal comprises a teach pendant, a display and a manipulator, a structure of the teach pendant is the same as that of the multi-axis robotic arm 100, the teach pendant is operated in a network connection state, and the multi-axis robotic arm 100 follows the teach pendant; the display is used to display the image captured by the monitoring module 200, and the manipulator is configured to operate the acupuncture operation group 300.

The control principle can be understood as setting a teaching pendant with the same or roughly similar structure as the multi-axis robotic arm 100 at the remote end. The teaching pendant and the multi-axis robotic arm 100 are connected through network signals. Professional medical staff can operate the teaching pendant to make the multi-axis robotic arm 100 move synchronously. The movement trajectory of the multi-axis robotic arm 100 is exactly the same as that of the teaching pendant.

Figure 2:
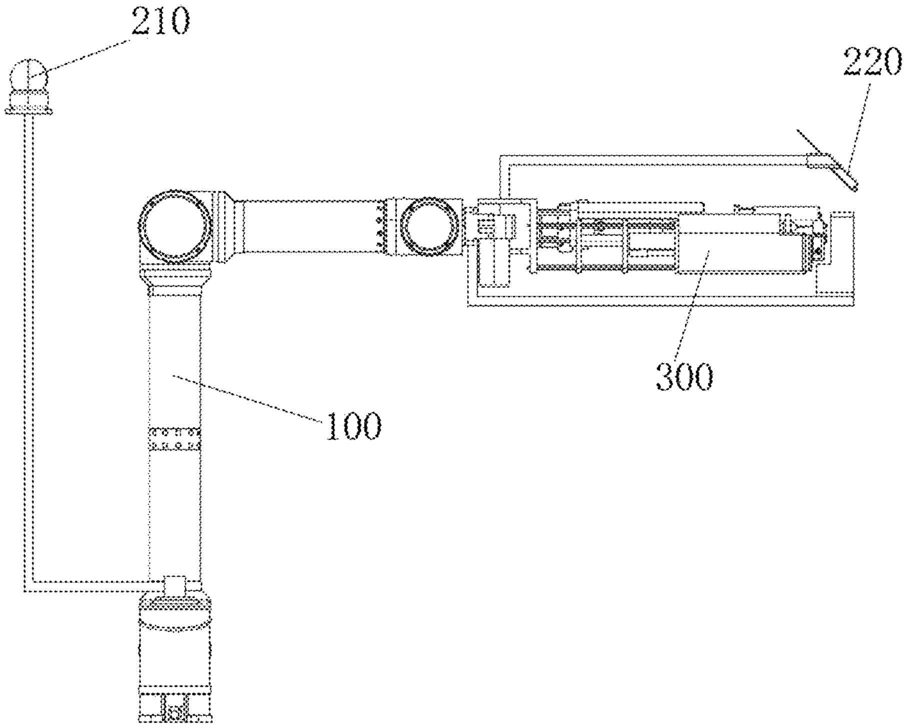
FIG. 2 is a side view of the acupuncture robot according to the present embodiment.
Figure 3:
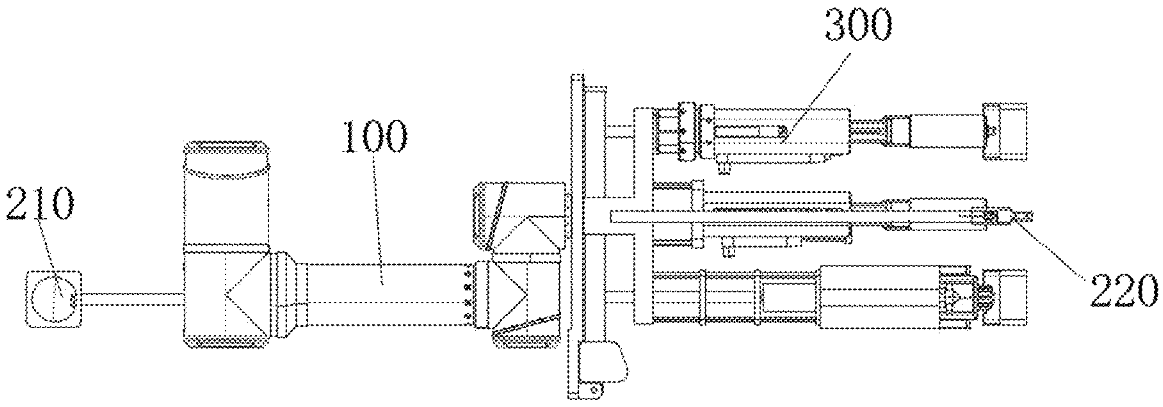
FIG. 3 is a top view of the acupuncture robot according to the present embodiment.
Figure 4:
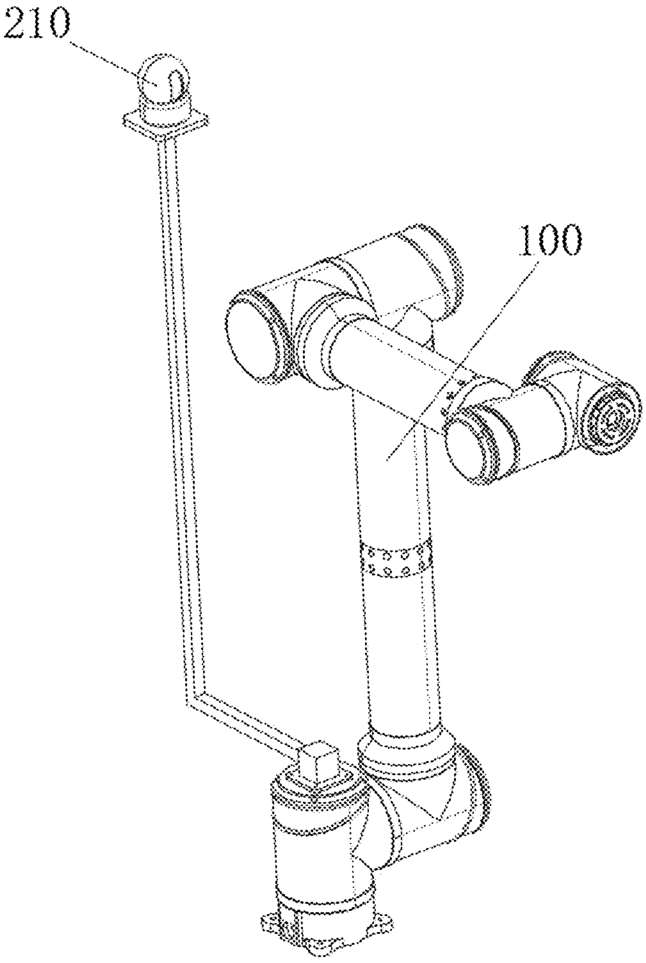
FIG. 4 is a schematic structural view of the multi-axis robotic arm.

However, it should be noted that in order to enable medical staff to accurately know the movement points of the multi-axis robot arm 100 and the acupuncture operation group 300 at the remote end, the monitoring module 200 plays an important role; referring to FIGS. 2 to 4, in the specific embodiment of the present scheme, the monitoring module 200 includes a first monitor 210 and a second monitor 220; wherein, the first monitor 210 is installed on the multi-axis robot arm 100, and the first monitor 210 is configured to monitor the movement state of the acupuncture operation group 300; of course, the first monitor 210 here also monitors the position state of the multi-axis robot arm 100 at the same time; through the real-time transmission of the image by the first monitor 210, the medical staff at the remote end can make remote adjustments according to the specific positions of the multi-axis robot arm 100 and the acupuncture operation group 300. The second monitor 220 is installed on the acupuncture operation group 300, and the second monitor 220 is configured to capture the image of the acupuncture position on the human body. Here, the image accuracy of the second monitor 220 is significantly higher than that of the first monitor 210, because the first monitor 210 is only used to monitor the approximate position of the movement of the multi-axis robot 100 and the acupuncture operation group 300, but the second monitor 220 is a fine monitoring. The second monitor 220 is used to monitor and capture the image of the acupuncture position on the human body, providing reliable image support for the acupuncture operation group 300 to perform the next step of human acupuncture treatment.

Optionally, the multi-axis robotic arm 100 has at least two movable axes, and may be a five-axis or six-axis mechanical structure commonly found on the market. In this solution, a six-axis robotic arm is preferred, which enables the acupuncture operation group 300 to move freely within a spatial range, thereby improving the convenience and accuracy of the acupuncture process.

Therefore, the remote collaborative robot acupuncture system adopting this solution, with the cooperation of the multi-axis robotic arm 100, the monitoring module 200, the acupuncture operation group 300 and the remote operation terminal, can effectively perform remote acupuncture treatment on patients; at the same time, the application of intelligence to medical equipment can greatly improve work efficiency and reduce the labor intensity of medical staff.

In order to enable those skilled in the art to have a deeper understanding of the present invention, the components and structures of the present invention are described in detail below. Specifically, referring to FIGS. 5 and 6, the provided acupuncture operation group 300 includes a support module 310, a disinfection module 320, a needle insertion module 330 and a needle twisting module 340.

Among them, the support module 310 is used to provide a stable installation base for the disinfection module 320, the needle insertion module 330 and the needle twisting module 340. The support module 310 is fixed at the far end of the multi-axis robot 100, specifically, it is installed on the rotating shaft at the farthest end of the multi-axis robot 100; the disinfection module 320, the needle insertion module 330 and the needle twisting module 340 are fixed on the support module 310 in sequence and side by side; the multi-axis robot 100 drives the support module 310, and then it can simultaneously drive the disinfection module 320, the needle insertion module 330 and the needle twisting module 340, so that the disinfection module 320, the needle insertion module 330 and the needle twisting module 340 can complete the adjustment in space.

The specific steps of acupuncture treatment are as follows: when the entire acupuncture operation group 300 is close to the area where the patient needs acupuncture, the disinfection module 320 will first work to wipe and disinfect the area on the patient that needs acupuncture treatment; then the needle insertion module 330 will insert the acupuncture needle (or treatment needle) into the patient, and finally the needle twisting module 340 will clamp the acupuncture needle and rotate it back and forth to achieve the effect of manual needle twisting; at this point, the operation of acupuncture treatment of the patient using the acupuncture operation group 300 is completed, and finally the acupuncture needle is pulled out from the patient for storage.

Figure 5:
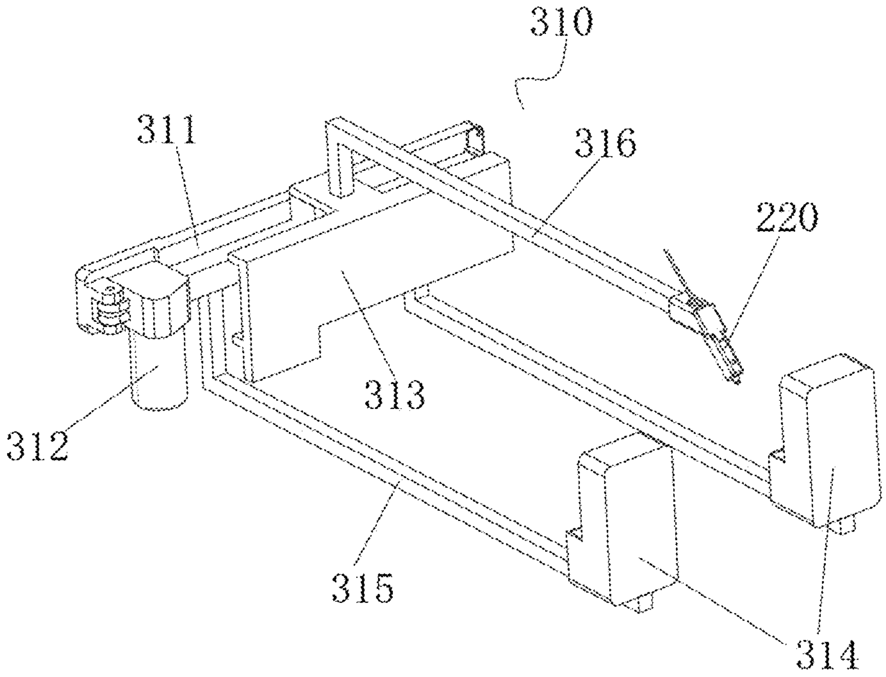
FIG. 5 is a schematic structural view of the support module.

As an important supporting structure, the support module 310 proposes a design based on the rationality of the structure; specifically, referring to FIG. 5, the support module 310 includes a fixed plate 311, a linear motor module 312 and a support plate 313; the fixed plate 311 plays a transfer and fixing role, that is, the fixed plate 311 is connected to the far end of the multi-axis robot 100; the linear motor module 312 is fixed on the end face of the fixed plate 311 away from the multi-axis robot 100, and the support plate 313 is fixed on the slider of the linear motor module 312; the motor in the linear motor module 312 drives the slider to slide linearly left and right.

The linear motor module 312 here includes a motor 312*a*, a slider 312*b* and a slide rail 312*c*; the motor 312*a* and the slide rail 312*c* are fixedly connected to the fixed plate 311, and the slider 312*b* is slidably mounted on the slide rail 312*c*. Under the drive of the motor 312*a*, the slider 312*b* can slide back and forth on the slide rail 312*c*; at the same time, because the support plate 313 is fixed on the slider 312*b*, the sliding of the slider 312*b* will bring the support plate 313 to adjust and move in a synchronous linear manner. Similarly, because the disinfection module 320, the needle insertion module 330 and the needle twisting module 340 are all fixed on the support plate 313, therefore, under the cooperation of the linear motor module 312, the disinfection module 320, the needle insertion module 330 and the needle twisting module 340 can be adjusted and moved. According to the progress of acupuncture, medical staff select one of the disinfection module 320, the needle insertion module 330 or the needle twisting module 340 to act on the patient in an alternative adjustment and movement manner.

In this solution, the disinfection module 320, the needle insertion module 330 and the needle twisting module 340 are all fixed on the end surface of the support plate 313 away from the linear motor module 312. At the same time, in this solution, referring to FIG. 5, in order to better collect the cotton swabs in the disinfection module 320 and the needles in the needle insertion module 330 (the description of the cotton swabs and the needles will be introduced below), the support module 310 also has two storage boxes 314, and the two storage boxes 314 are respectively connected and fixed to the fixed plate 311 through the first connecting rod 315; under the support of the first connecting rod 315, the two storage boxes 314 protrude relative to the fixed plate 311; the two storage boxes 314 are arranged side by side, one on the left and one on the right. When the entire acupuncture operation group 300 is at the origin and not working, one of the storage boxes 314 is located in front of the needle twisting module 340 for collecting used needles; the other storage box 314 is located in front of the disinfection module 320 for storing the cotton swabs after disinfection of the human body.

In the bracket module 310 of the present solution, there is also a second connecting rod 316, one end of which is fixed on the bracket plate 313, and an extension direction of the second connecting rod 316 is the same as the extension direction of the first connecting rod 315; the second monitor 220 mentioned above is fixed at the distal end of the second connecting rod 316. Such a position design will enable the second monitor 220 to move simultaneously with the acupuncture operation group 300, and the second monitor 220 is closer to the patient's body, ensuring that the provided image is more accurate, thereby ensuring the treatment accuracy of the acupuncture operation group 300 on the patient.

In the bracket module 310, the motor in the linear motor module 312 is hingedly connected to the fixed plate 311 through a hinge structure; this allows the entire linear motor module 312 to be hinged and swung relative to the fixed plate 311 within a certain angle range; medical staff control the linear motor module 312 to swing relative to the fixed plate 311 according to the actual on-site conditions, thereby achieving the purpose of simultaneously swinging the disinfection module 320, the needle insertion module 330 and the needle twisting module 340 within a certain angle range.

The above-mentioned bracket module 310 is a specific component structure in this embodiment. In actual design and application, the structure of the bracket module 310 can be modified and designed according to actual on-site needs. In other embodiments, the design of the bracket module 310 or the structure of connecting the disinfection module 320, the needle insertion module 330 and the needle twisting module 340 with the multi-axis robot arm 100 using the bracket module 310 should be within the protection scope of this solution.

In this solution, the specific structures for acupuncture treatment are the disinfection module 320, the needle insertion module 330 and the needle twisting module 340. The three modules work and move in the following manner: first, the disinfection module 320 works to wipe and disinfect the position on the patient's body that requires acupuncture treatment; then the needle insertion module 330 inserts the acupuncture needle (treatment needle) into the patient's body, and finally the needle twisting module 340 clamps the acupuncture needle and rotates back and forth to achieve the effect of needle twisting treatment.

For ease of understanding, the structures of the disinfection module 320, the needle insertion module 330 and the needle twisting module 340 are introduced one by one below.

Figure 7:
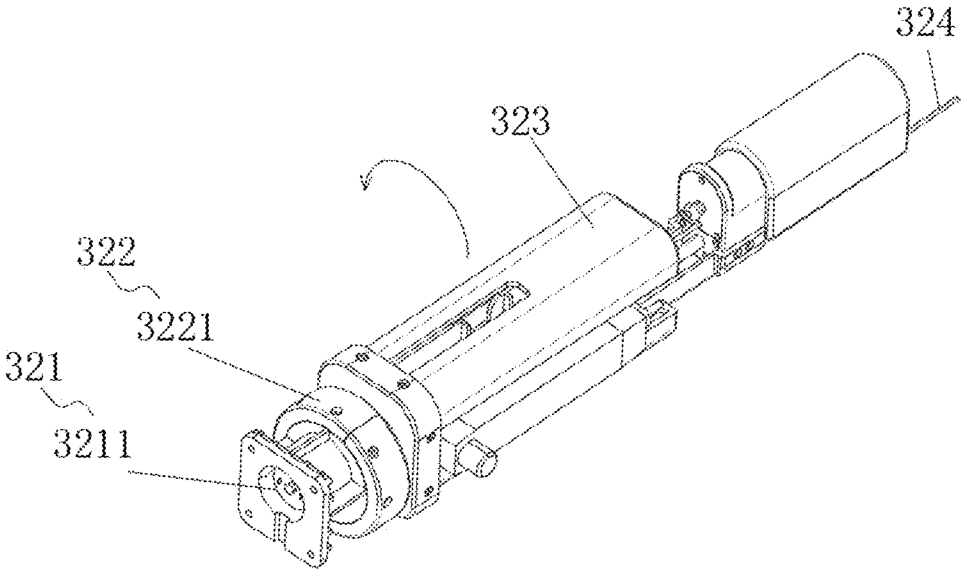
FIG. 7 is a schematic view of the disinfection module.

Referring to FIG. 7, the disinfection module 320 is located at the innermost side of the three parallel modules. Its composition structure includes a first support component 321, an eccentric drive component 322, a disinfection propulsion component 323 and a cotton swab 324; the cooperation relationship between them is that the first support component 321 is fixed to the end face of the bracket plate 313, and the eccentric drive component 322 is fixed to the first support component 321; specifically, the eccentric drive component 322 is fixed to the bracket plate 313 through the first support frame 3211 in the first support component 321; the disinfection propulsion component 323 is fixed to the eccentric drive component 322; and the cotton swab 324 is arranged in front of the disinfection propulsion component.

The first support component 321 mainly plays a supporting role, and the eccentric drive component 322 has an eccentric motor 3221 for generating eccentric rotation; the disinfection propulsion component 323 is used to drive the cotton swab 324 to extend straightly to contact an acupuncture site of the human body; the disinfection propulsion component 323 is connected to the output shaft of the eccentric motor 3221, so the eccentric drive component 322 is configured to drive the disinfection propulsion component 323 and the cotton swab 324 to perform eccentric rotation, and the eccentric rotation of the cotton swab 324 can realize wiping and disinfecting the acupuncture site of the human body. This process is a process of wiping and disinfecting the patient's body through intelligent control.

Specifically, the first support frame 3211 here is a support plate, one side of which is fixed to the bracket plate 313, and the other side is fixed with a flange-like part; the eccentric drive component 322 is an eccentric motor 3221, and the eccentric motor 3221 is fixedly connected to the flange-like part.

The disinfection propulsion component 323 includes a first shell, a first propulsion part of a cotton swab, and a second propulsion part of a cotton swab; the first propulsion part of a cotton swab and the second propulsion part of a cotton swab are both built into the first shell, and the first shell plays a good protective role, and can also prevent external impurities and dust from entering the interior. The second propulsion part of the cotton swab is fixed on the first propulsion part of the cotton swab, and the second propulsion part of the cotton swab is extended after the first propulsion part of the cotton swab is extended, by adopting this two-stage propulsion method, the propulsion distance length of the cotton swab 324 can be effectively guaranteed; of course, at this time, the cotton swab 324 is located in front of the second propulsion part of the cotton swab, and after the second propulsion part of the cotton swab is extended, the cotton swab 324 here can be pushed out to contact the human body.

Figure 8:
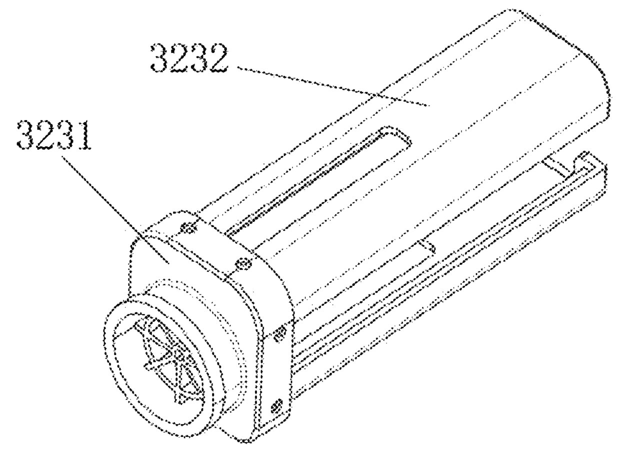
FIG. 8 is a schematic view of the first shell in the disinfection propulsion component.

Referring to FIG. 8, the first shell here includes an end panel 3231 and a first housing 3232; the end surface of the end panel 3231 opposite to the eccentric motor 3221 has a connecting shaft end; the end panel 3231 is connected and fixed to the output end of the eccentric motor 3221 by using the connecting shaft end here; the first housing 3232 is connected and fastened to the end panel 3231 by bolts, and a slide rail is provided on the inner wall of the first housing 3232, and the slide rail here is mainly used to cooperate with the slide groove in the first propulsion part of the cotton swab, thereby ensuring that the first propulsion part of the cotton swab can slide smoothly relative to the first housing 3232.

Optionally, a plurality of weight-reducing cavities are provided on the first housing 3232, which can not only reduce the overall weight of the disinfection propulsion component 323 to a certain extent, but also facilitate medical staff to check the movement of the first propulsion part and the second propulsion part of the cotton swab.

Figure 9:
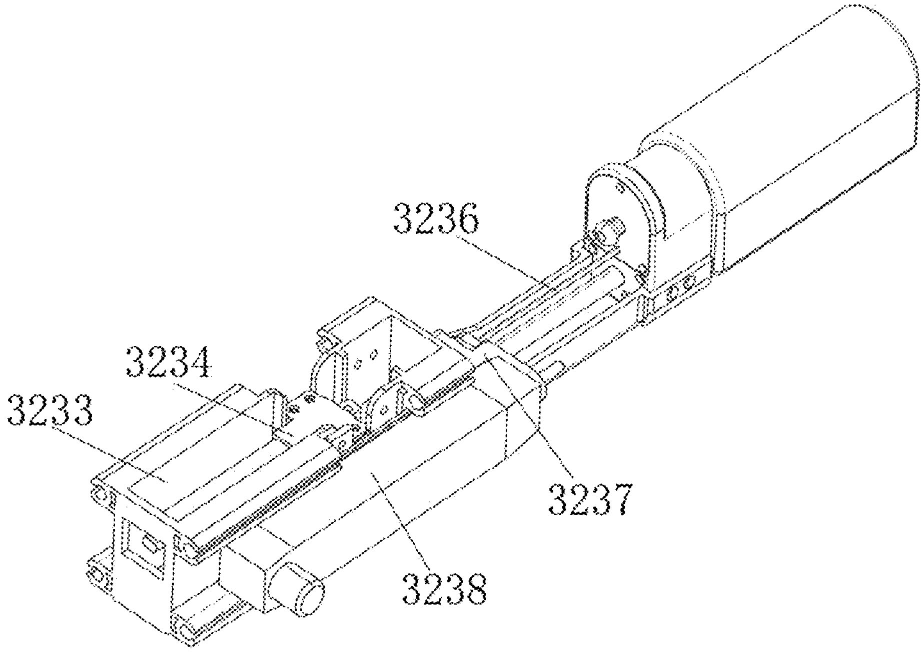
FIG. 9 is a schematic structural view of the first sliding seat body in the disinfection propulsion component.
Figure 10:
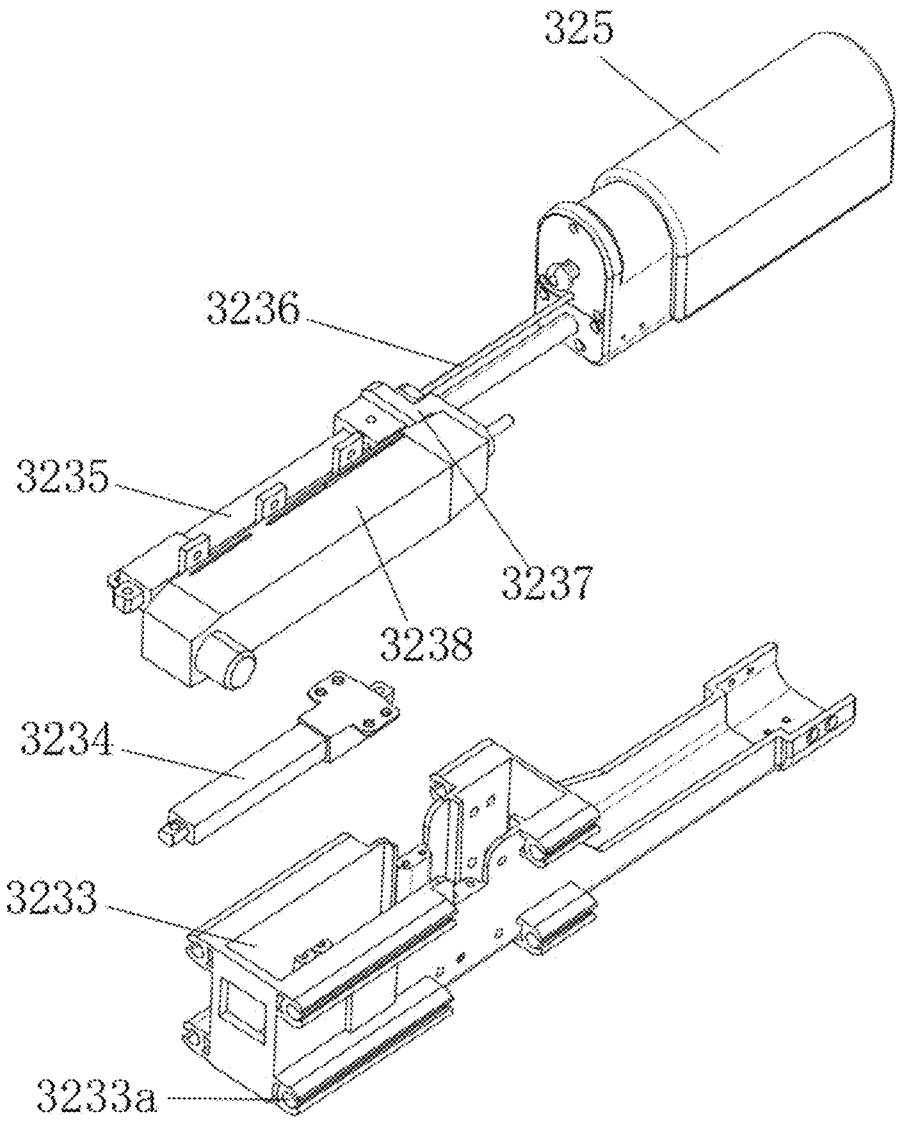
FIG. 10 is an exploded view of first propulsion part for the cotton swab.

Referring to FIG. 9-FIG. 10, the first propulsion part includes a first sliding seat body 3233 and a first cotton swab pusher 3234; specifically, a concave cavity is provided in the first sliding seat body 3233, and the first cotton swab pusher 3234 is provided in the concave cavity; a limiting notch is provided on the side wall of the concave cavity; the first cotton swab pusher 3234 has a T-shaped slider and a push rod; the T-shaped slider slides back and forth in a straight line under the support and push of the push rod. The T-shaped slider of the first cotton swab pusher 3234 is just engaged with the limiting notch, and one end of the push rod of the first cotton swab pusher 3234 passes through the first sliding seat body 3233 and is fixed to the external end panel 3231.

It can be understood that the push rod portion of the first cotton swab pusher 3234 is fixed to the end panel 3231, and the T-shaped slider portion of the first cotton swab pusher 3234 is snap-fitted with the limiting notch of the first sliding seat body 3233. The first cotton swab pusher 3234 drives the T-shaped slider portion to move back and forth, and the T-shaped slider portion also synchronously drives the first sliding seat body 3233 to move back and forth in a straight line.

Optionally, a slide groove 3233*a* is further provided on the outer side surface of the first sliding seat body 3233, and the slide groove 3233*a* is provided on two opposite outer sides of the first sliding seat body 3233, and a slide groove 3233*a* is arranged at the upper and lower positions of each of the outer side surfaces; it can be understood that there are slide grooves 3233*a* at the four corners of the first sliding seat body 3233; the slide groove 3233*a* here is used to cooperate with the slide rail on the inner wall of the first housing 3232, and the first cotton swab pusher 3234 can drive the first sliding seat body 3233 to perform a linear telescopic motion relative to the first housing 3232, and the close cooperation between the slide rail and the slide groove 3233*a* ensures that the first sliding seat body 3233 can slide smoothly relative to the first housing 3232.

Optionally, the slide rail is cylindrical in shape, and the slide groove 3233*a* is a cylindrical groove that matches the slide rail; in another embodiment, the slide rail can also be T-shaped, and the slide groove 3233*a* is a T-shaped groove in this case; it should be noted that whether it is cylindrical or T-shaped, the main purpose is to ensure the sliding stability of the first sliding seat body 3233 and the first shell body 3232.

Optionally, the push rod portion of the first cotton swab pusher 3234 is connected to the end panel 3231 in a hinged manner.

The second propulsion part of the cotton swab includes a second cotton swab pusher 3235 and a cotton swab push rod 3236; the second cotton swab pusher 3235 is fixed at the bottom of the concave cavity of the first sliding seat body 3233, one end of the cotton swab push rod 3236 is fixed at the output end of the second cotton swab pusher 3235, and the other end of the cotton swab push rod 3236 passes through the first sliding seat body 3233 and faces the cotton swab 324 on the outside.

At this point, the specific working principle is that the first cotton swab pusher 3234 will push the entire first sliding seat body 3233 to extend; then, the second cotton swab pusher 3235 in the first sliding seat body 3233 will extend again, so that the cotton swab push rod 3236 extends and pushes the external cotton swab 324, and the extended cotton swab 324 is just at the position to be acupuncture on the patient's body.

The disinfection pushing component 323 also includes a push-in measuring part, which is mainly used to measure the extension movement range of the cotton swab push rod 3236. If the extension length of the second cotton swab pusher 3235 is too long, the cotton swab 324 will inevitably be tightly pressed against the patient, causing serious discomfort to the patient during rotational disinfection. The extension length of the cotton swab push rod 3236 is measured by the push-in measuring part here, and the extension length of the second cotton swab pusher 3235 can be adjusted according to actual conditions, or the length of the cotton swab 324 can be adjusted. In this way, under the limiting effect of the push-in measuring part, the cotton swab 324 can always be maintained in an appropriate extension range, and when the cotton swab 324 is extended to wipe and disinfect the human body, the comfort of the disinfection process is guaranteed.

Specifically, the push-in measuring part includes a mounting block 3237 and an electronic ruler 3238; the electronic ruler 3238 is fixed on the outer end surface of the first sliding seat body 3233; in order to reasonably plan the space and improve the space utilization rate, the electronic ruler 3238 is specifically fixed between two slide grooves 3233*a* on the outer end surface of one side of the first sliding seat body 3233. The mounting block 3237 is fixedly mounted on the cotton swab push rod 3236, and the mounting block 3237 is also fixed to the measuring axis of the electronic ruler 3238; as long as the cotton swab push rod 3236 is pushed out by the second cotton swab pusher 3235, the mounting block 3237 will pull the measuring axis out, and the extended length of the measuring axis will be displayed on the electronic ruler 3238, and the displayed value is also the pushed-out length value of the second cotton swab pusher 3235. Optionally, the first cotton swab pusher 3234 and the second cotton swab pusher 3235 can be electric or pneumatic, which can be selected according to actual conditions.

In the present solution, the disinfection module 320 also includes a cotton swab storage component 325, in which a plurality of cotton swabs 324 are pre-stored. Each time a patient is replaced, the cotton swab storage component 325 will provide a new cotton swab 324 for the cotton swab push rod 3236 to push out for disinfection. By storing more cotton swabs 324 in the cotton swab storage component 325 in advance, medical staff can avoid the tedious replacement of cotton swabs 324, which is beneficial to improving the disinfection efficiency of patients.

Figure 11:
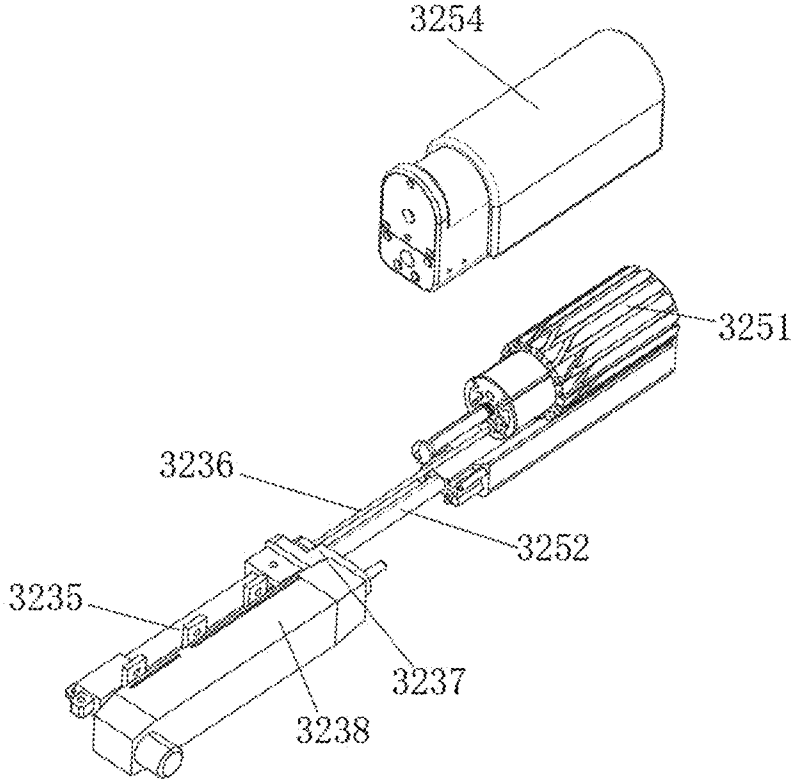
FIG. 11 is a schematic view of the coordination between the second propulsion part of a cotton swab and a cotton swab storage component.
Figure 15:
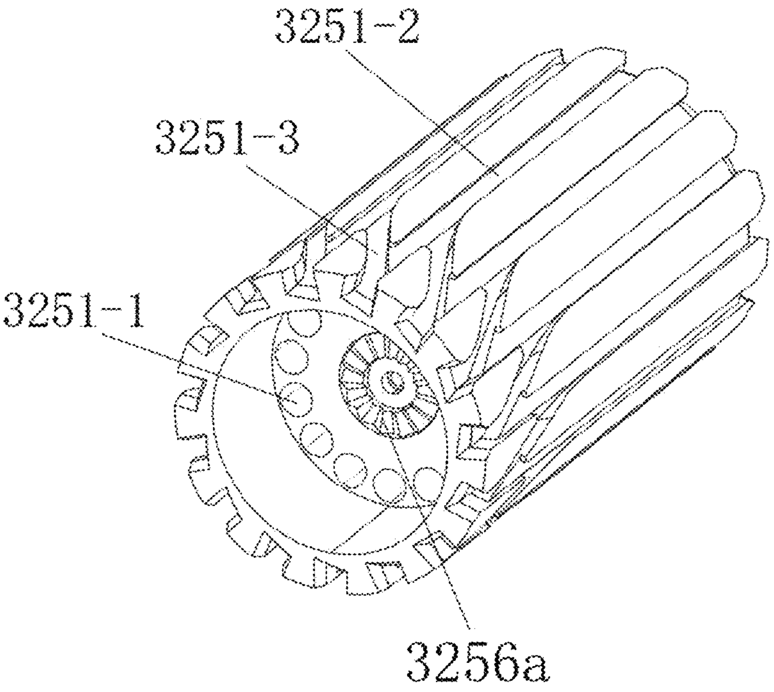
FIG. 15 is a schematic three-dimensional structural view of a cotton swab storage rotating wheel.
Figure 16:
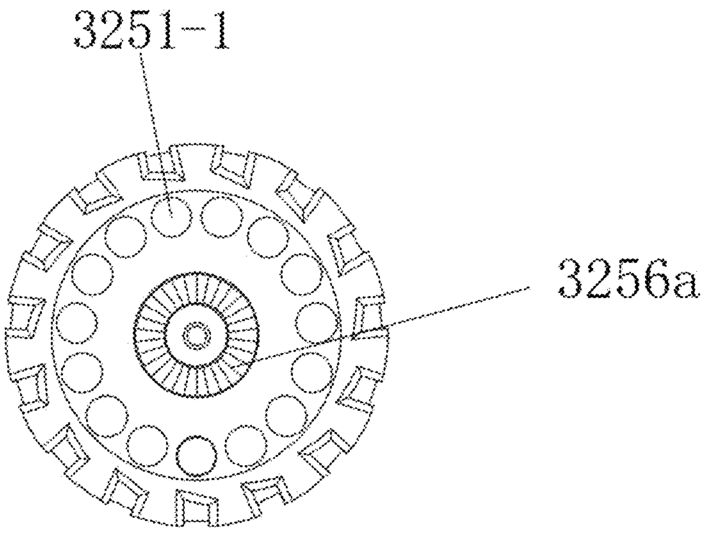
FIG. 16 is a planar structural view of a cotton swab storage rotating wheel in a front view.
Figure 17:
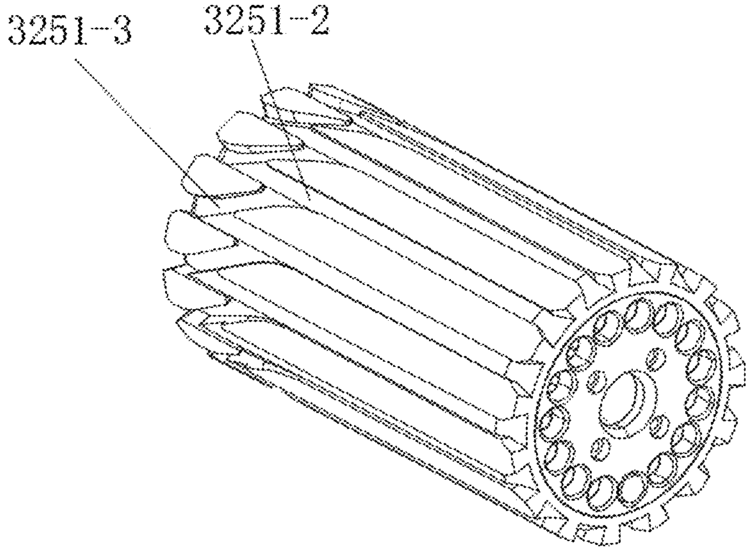
FIG. 17 is a planar structural view of a cotton swab storage rotating wheel in a rear view.

Specifically, referring to FIGS. 11, 15 and 16, the cotton swab storage component 325 has a cotton swab storage rotating wheel 3251, and the cotton swab storage rotating wheel 3251 has multiple cotton swab storage chambers 3251-1. Each cotton swab storage chamber 3251-1 accommodates a cotton swab 324. Each extension and retraction action of the cotton swab push rod 3236 in the disinfection propulsion component 323 will cause the cotton swab storage rotating wheel 3251 to rotate. Each time the cotton swab storage rotating wheel 3251 rotates, a new cotton swab 324 will correspond to the cotton swab push rod 3236. In this way, each extension action of the cotton swab push rod 3236 will push out the cotton swabs 324 in different cotton swab storage chambers 3251-1.

In this solution, the rotation of the cotton swab storage rotating wheel 3251 is synchronized with the extension of the cotton swab push rod 3236. Specifically, a toggle rod 3252 is fixed at the output end of the second cotton swab pusher 3235. The toggle rod 3252 is parallel and side by side with the cotton swab push rod 3236. The toggle rod 3252 extends along to the bottom of the cotton swab storage rotating wheel 3251. A toggle column 3253 is also provided on the toggle rod 3252. The toggle column 3253 can toggle the cotton swab storage rotating wheel 3251; that is, every time the second cotton swab pusher 3235 is extended, the toggle column 3253 will toggle the cotton swab storage rotating wheel 3251 here, so that different cotton swabs 324 in the cotton swab storage rotating wheel 3251 correspond to the cotton swab push rod 3236.

Figure 12:
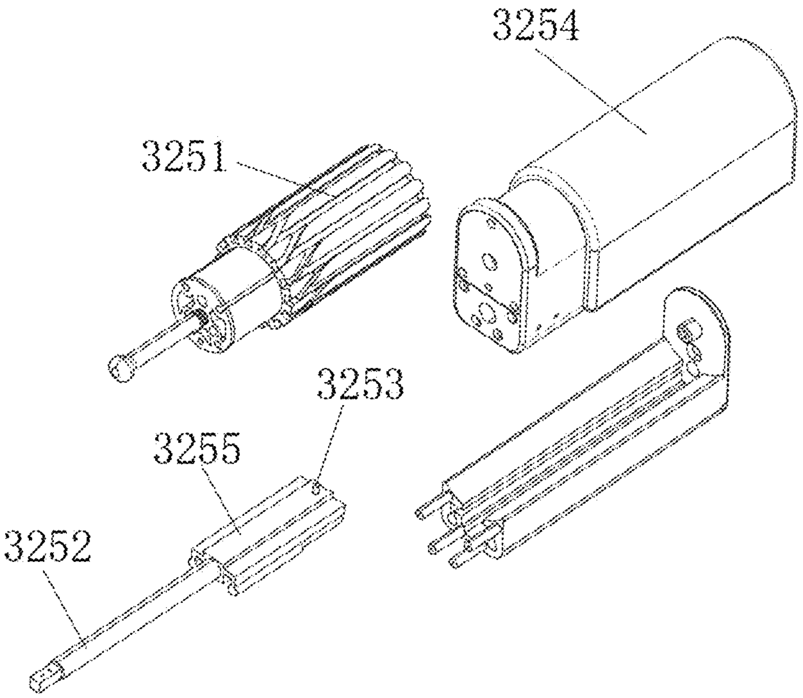
FIG. 12 is an exploded structural view of a cotton swab storage component.
Figure 13:
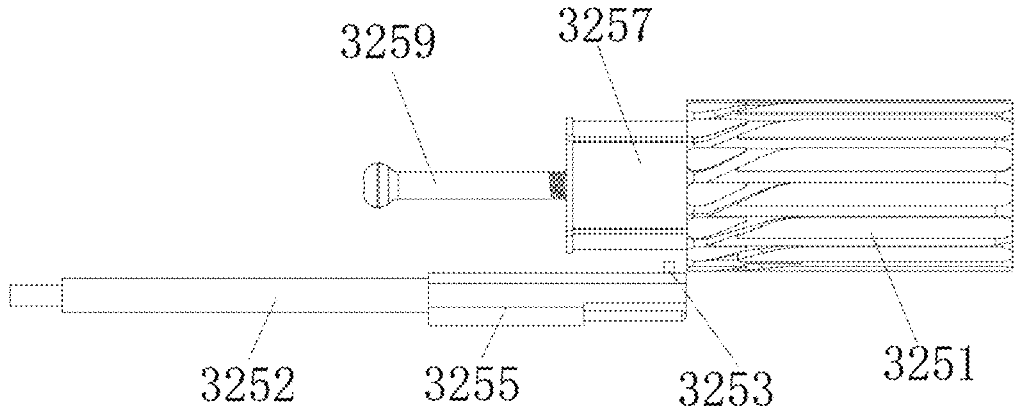
FIG. 13 is a schematic view of the coordination structure between a cotton swab push rod and a cotton swab storage rotating wheel.
Figure 14:
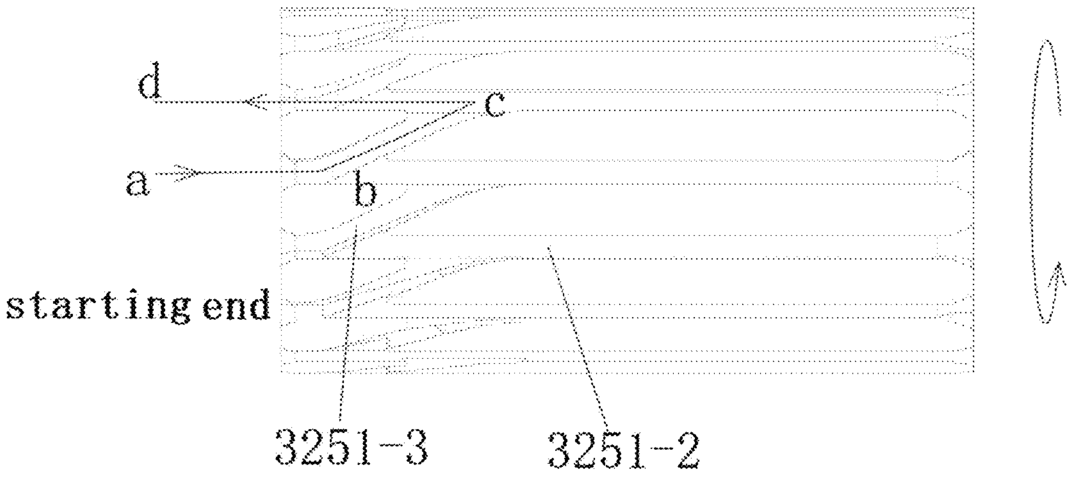
FIG. 14 is a planar structural view of a cotton swab storage rotating wheel in a side view.

In the present solution, referring to FIGS. 11 to 13, the cotton swab storage component 325 also includes a storage shell 3254, and the first sliding seat body 3233 has an extension body extending outward; the storage shell 3254 is fixedly connected to the extension body here; the cotton swab storage rotating wheel 3251 is rotatably arranged in the storage shell 3254; a toggle slider 3255 is arranged at the far end of the toggle rod 3252, and the toggle column 3253 is elastically connected to the upper end surface of the toggle slider 3255, and the toggle slider 3255 can slide back and forth in a straight line in the base of the storage shell 3254; by arranging the toggle slider 3255, the stability of the linear sliding of the toggle column 3253 can be ensured, ensuring that the cotton swab storage rotating wheel 3251 can be rotated every time.

In order to facilitate understanding of the specific rotation principle of the cotton swab storage rotating wheel 3251, it is introduced in detail here.

Referring to 14 to 17, the cotton swab storage rotating wheel 3251 includes two parts, including an outer cylindrical part and an inner cylindrical part which are coaxially arranged, and the inner cylindrical part is embedded and fixed in the outer cylindrical part; the cotton swab storage cavity 3251-1 mentioned above penetrates the inner cylindrical part here in a ring-shaped arrangement; the outer arc surface of the outer cylindrical part has a first guide slide 3251-2 and a second guide slide 3251-3; wherein the first guide slide 3251-2 extends along the axial direction of the outer cylindrical part, and the starting end of the first guide slide 3251-2 is located at one end face of the outer cylindrical part and extends along to the other end face; the starting end of the second guide slide 3251-3 coincides with the starting end of the first guide slide 3251-2, but the second guide slide 3251-3 is inclined until it is connected with the adjacent first guide slide 3251-2.

Each time the toggle post 3253 is extended, it enters from the second guide slide 3251-3, gradually toggling the cotton swab storage rotating wheel 3251 to rotate until it enters the first guide slide 3251-2; then the toggle post 3253 retreats, and the cycle repeats. The specific movement path of the toggle post 3253 is a→b→c→d. After each section of the path, the cotton swab storage rotating wheel 3251 rotates a little, so that the adjacent cotton swab storage chamber 3251-1 rotates to correspond to the cotton swab push rod 3236.

It should be noted that in order to ensure the correct extension and retraction movement path of the toggle column 3253 each time, the depth of the starting end of the second guide slide 3251-3 is H1, and the depth of the first guide slide 3251-2 is H2, H1>H2; at the same time, because the second guide slide 3251-3 and the first guide slide 3251-2 are connected; the depth of the connection (junction) is H3, H1>H2>H3.

It can be understood that the depth of the second guide slide 3251-3 gradually decreases, the depth of the starting end of the second guide slide 3251-3 is H1, and the depth of the end of the second guide slide 3251-3 is H3 (equivalent to the connection with the first guide slide 3251-2); through such a design, each time the toggle column 3253 is extended, it can enter from the starting end of the second guide slide 3251-3, and the driving force will drive the cotton swab storage rotating wheel 3251 to rotate until it passes through the connection and enters the first guide slide 3251-2, at this time, the cotton swab storage rotating wheel 3251 rotates into place, and the toggle column 3253 retreats and resets along the first guide slide 3251-2.

Optionally, the cotton swab can be improved, that is, a cotton swab is placed in a cotton swab holding cavity. At this time, the cotton swab is composed of ten small sections, and each cotton swab holding cavity can be disinfected ten times. There are specifically 16 cotton swab holding cavities in the cotton swab storage rotating wheel 3251, which is generally more convenient than the current method of dipping the cotton swab in alcohol liquid each time, and can accommodate 16*10 small sections of cotton swabs.

In this solution, in order to ensure that the cotton swab storage rotating wheel 3251 does not deflect after each rotation, a rotation limiting structure is also provided. The working principle of the rotation limiting structure is that each time the cotton swab storage rotating wheel 3251 rotates to a certain angle, the rotation limiting structure will limit the position of the cotton swab storage rotating wheel 3251 to prevent the cotton swab storage rotating wheel 3251 from shaking or position deviation, and ensure that the cotton swab push rod 3236 can smoothly push out the cotton swab 324 in the cotton swab storage cavity 3251-1 each time.

Figure 18:
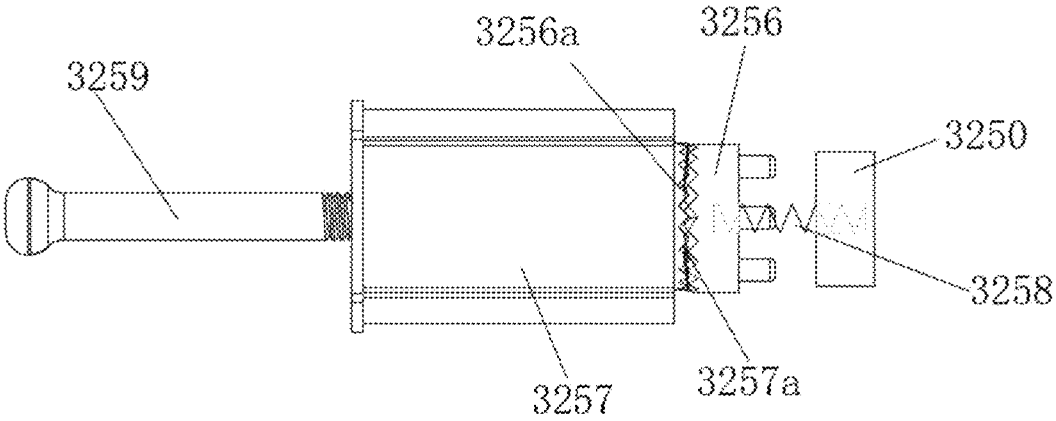
FIG. 18 shows the composition of a rotation limiting structure.

Specifically, the rotation limiting structure is mainly composed of three parts, see FIG. 18, including a wheel chuck 3256, a docking chuck 3257 and a mounting seat 3250, the mounting seat 3250 is fixed on the inner cylindrical portion of the cotton swab storage rotating wheel 3251, and the three positioning guide pins of the wheel chuck 3256 are installed on the inner cylindrical portion of the cotton swab storage rotating wheel 3251, and the wheel chuck 3256 is elastically connected to the mounting seat 3250 through a spring 3258; the outward end face of the wheel chuck 3256 has a first tooth surface 3256*a*; the docking chuck 3257 is coaxially arranged with the wheel chuck 3256 here, and the other end of the docking chuck 3257 is connected to the reserve shell 3254 through a threaded adjustment rod 3259, and a second tooth surface 3257*a* is provided on the other end of the docking chuck 3257, and the first tooth surface 3256*a* and the second tooth surface 3257*a* are opposite to each other; under the action of the spring 3258, the wheel chuck 3256 and the docking chuck 3257 make the first tooth surface 3256*a* and the second tooth surface 3257*a* mesh with each other. That is, the wheel chuck 3256 and the docking chuck 3257 are meshed with each other to prevent the cotton swab storage rotating wheel 3251 from shifting.

The specific working principle is as follows: when the cotton swab storage rotating wheel 3251 rotates, the mounting seat 3250 and the wheel chuck 3256 installed in the cotton swab storage rotating wheel 3251 rotate synchronously; the first tooth surface c starts to rotate with respect to the second tooth surface 3257*a*, and the misalignment between the tooth surfaces will push the wheel chuck 3256 to move backward, and at the same time, the spring 3258 is compressed and stored. After the cotton swab storage rotating wheel 3251 rotates to the right position, the tooth surfaces correspond again. At this time, under the rebound effect of the spring 3258, the first tooth surface and the second tooth surface are meshed again; when in the meshing state, the cotton swab storage rotating wheel 3251 is in the most stable state. Each time the cotton swab storage rotating wheel 3251 rotates, the first tooth surface 3256*a* is dislocated relative to the second tooth surface 3257*a* and meshes again under the action of the spring 3258.

Optionally, the threaded adjustment rod 3259 is connected to the docking chuck 3257 by a threaded connection, so that during specific use, the threaded adjustment rod 3259 can be rotated to adjust the screwing depth with the docking chuck 3257, thereby achieving the purpose of adjusting the meshing force between the first tooth surface 3256*a* and the second tooth surface 3257*a*.

After the disinfection module 320 completes the disinfection of the patient's skin, it is necessary to operate the needle insertion module 330 and use the puncture needle (also called treatment needle) in the needle insertion module 330 to puncture the patient's skin.

Figure 6:
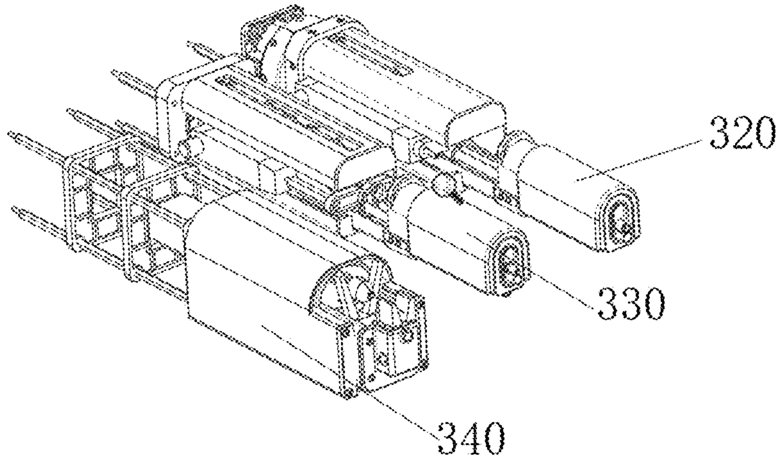
FIG. 6 shows a position arrangement distribution of the disinfection module, the needle insertion module and the needle twisting module.
Figure 19:
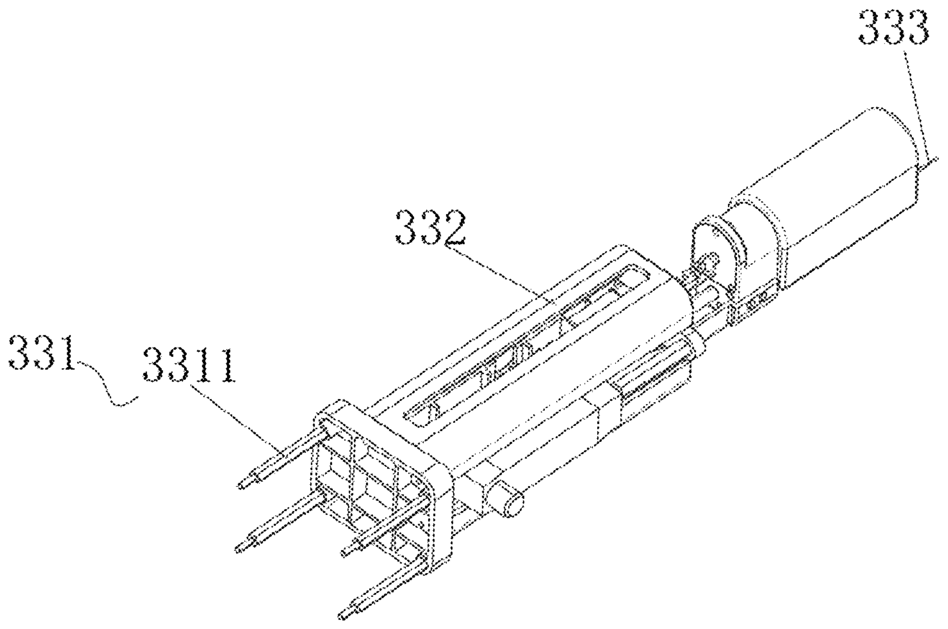
FIG. 19 is a schematic three-dimensional view of the needle insertion module.

Specifically, referring to FIG. 6 and FIG. 19, the needle insertion module 330 is located in the middle of the three parallel modules. Its composition structure includes a second support component 331, an acupuncture propulsion component 332 and a needle 333; the connection relationship between the second support component 331, the acupuncture propulsion component 332 and the needle 333 is that the second support component 331 is also fixed to the end surface of the bracket plate 313, and the acupuncture propulsion component 332 is fixed to the second support component 331; specifically, the acupuncture propulsion component 332 is fixed to the bracket plate 313 through the second support frame 3311 in the second support component 331; the needle 333 is arranged in front of the acupuncture propulsion component 332.

The second support component 331 here mainly plays a supporting role, and the second support frame 3311 is specifically a support rod fixed on the bracket plate 313; the acupuncture propulsion component 332 is used to drive the needle 333 to extend straight out to penetrate into the human body.

The composition structure of the acupuncture propulsion component 332 is substantially the same as the composition structure of the disinfection propulsion component 323 described above, and its main purpose is to smoothly push out the acupuncture needle 333 here through two-stage telescopic movement.

Specifically, the acupuncture propulsion component 332 includes a second shell, a first propulsion part of the needle, and a second propulsion part of the needle; the first propulsion part of the needle and the second propulsion part of the needle are both built into the second shell, and the second shell plays a good protective role and can also prevent external impurities and dust from entering the interior. The second propulsion part of the needle is fixed on the first propulsion part of the needle, and the second propulsion part of the needle is extended after the first propulsion part of the needle is extended. By adopting a two-stage propulsion method, the propulsion distance can be effectively guaranteed; of course, at this time, the needle 333 is located in front of the second propulsion part of the needle, and the second propulsion part of the needle can push the needle 333 here into the human body after it is extended.

Figure 20:
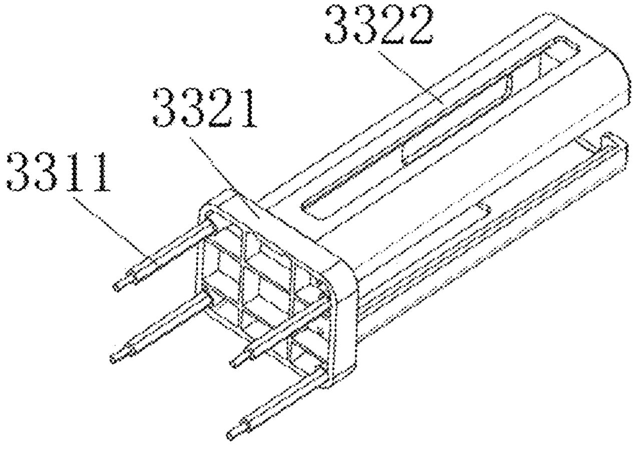
FIG. 20 is a schematic three-dimensional view of the second outer shell part of the acupuncture propulsion component.

Referring to FIG. 20, the second shell includes a fastening plate 3321 and a second housing 3322; the fastening plate 3321 is fixed on four support rods; the second housing 3322 is connected and fastened to the fastening plate 3321 by bolts. At the same time, a slide rail 3322*a* is provided on the inner wall of the second housing 3322, and the slide rail 3322*a* is mainly used to cooperate with the slide groove 3233*a* in the first propulsion part of the needle, thereby ensuring that the first propulsion part of the needle can slide smoothly relative to the second housing 3322. A plurality of weight-reducing cavities are also provided on the second housing 3322, which can not only reduce the overall weight of the acupuncture propulsion component 332 to a certain extent, but also facilitate medical staff to check the movement of the first propulsion part and the second propulsion part of the needle.

Figure 21:
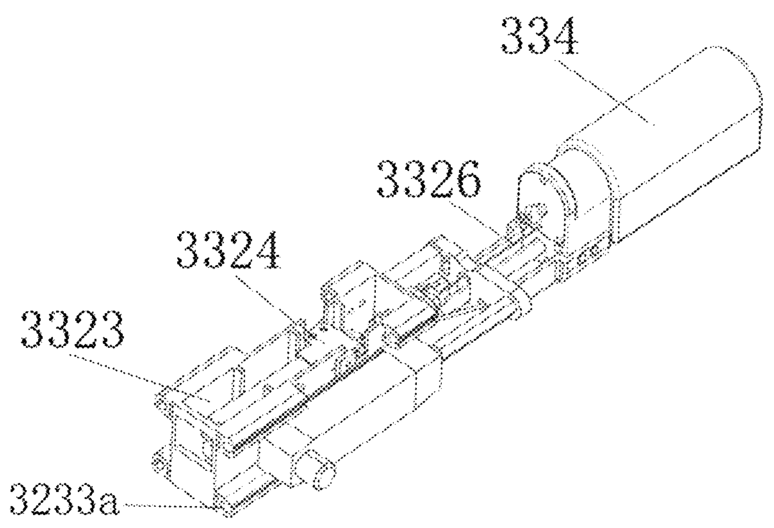
FIG. 21 is a structural view of the first sliding seat body in the acupuncture propulsion component.
Figure 22:
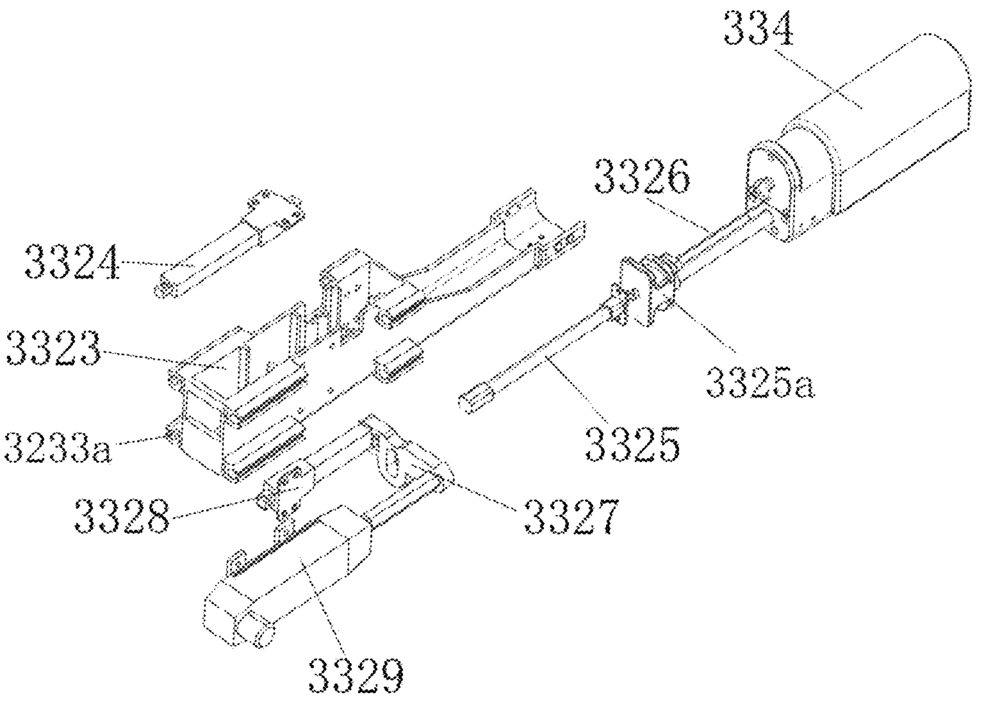
FIG. 22 is an exploded structural view of the first propulsion part of the needle.

Referring to FIG. 21-22, the first propelling part of the needle includes a second sliding seat body 3323 and a first needle pusher 3324. Specifically, a concave cavity is provided in the second sliding seat body 3323, and the first needle pusher 3324 is provided in the concave cavity here. A limiting notch is provided on the side wall of the concave cavity. The first needle pusher 3324 has a T-shaped slider and a push rod. The T-shaped slider slides back and forth in a straight line under the support and push of the push rod. The T-shaped slider of the first needle pusher 3324 is just engaged with the limiting notch here, and one end of the push rod of the first needle pusher 3324 passes through the second sliding seat body 3323 and is hingedly fixed to the external fastening plate 3321.

It can be understood that the push rod portion of the first needle pusher 3324 is hinged and fixed to the fastening plate 3321, and the T-shaped slider portion of the first needle pusher 3324 is snap-fitted with the limiting notch of the second sliding seat body 3323. The first needle pusher 3324 drives the T-shaped slider portion to move back and forth, and the T-shaped slider portion also synchronously drives the second sliding seat body 3323 to move back and forth in a straight line.

Optionally, a slide groove 3233*a* is further provided on the outer side surface of the second sliding seat body 3323, and the slide groove 3233*a* is provided on two opposite outer sides of the second sliding seat body 3323, and a slide groove 3233*a* is arranged at the upper and lower positions of each of the outer side surfaces; it can be understood that there are slide grooves 3233*a* at the four corners of the second sliding seat body 3323; the slide groove 3233*a* here is used to cooperate with the slide rail on the inner wall of the second housing 3322, and the first needle pusher 3324 can drive the second sliding seat body 3323 to perform a linear telescopic motion relative to the second housing 3322, and the close cooperation between the slide rail and the slide groove 3233*a* ensures that the second sliding seat body 3323 can slide smoothly relative to the second housing 3322.

Also optionally, the slide rail is cylindrical in shape, and the slide groove 3233*a* is a cylindrical groove adapted to the slide rail; in another embodiment, the slide rail can also be T-shaped, and the slide groove 3233*a* is a T-slot in this case; it should be noted that, whether it is cylindrical or T-shaped, the main purpose is to ensure the stability of the connection between the second sliding seat body 3323 and the second housing 3322.

Optionally, the push rod portion of the first needle pusher 3324 is connected to the fastening plate 3321 in a hinged manner.

The second propulsion part of the needle includes a second needle pusher 3325 and a push rod 3326; the second needle pusher 3325 is fixed at the bottom of the concave cavity of the second sliding seat body 3323, one end of the push rod 3326 is fixed at the output end of the second needle pusher 3325, and the other end of the push rod 3326 passes through the second sliding seat body 3323 and faces the needle 333 on the outside.

The specific working principle is that the first needle pusher 3324 will push the entire second sliding seat body 3323 to extend; then, the second needle pusher 3325 in the second sliding seat body 3323 will extend again, so that the needle push rod 3326 extends to push the external needle 333, and the extended needle 333 is just in the position to be inserted into the patient's body for acupuncture.

In this solution, the acupuncture propulsion component 332 also includes a needle depth control unit, which is mainly used to measure the extension range of the needle push rod 3326, so as to achieve the purpose of controlling the insertion depth of the needle 333. If the extension length of the second needle pusher 3325 is too long, the needle 333 will inevitably penetrate deeper into the human body, which will cause serious damage; the extension length of the needle pusher 3326 can be measured and controlled by the needle depth control unit here, and the extension length of the second needle pusher 3325 can be adjusted according to actual conditions, or the length of the needle 333 can be adjusted; in this way, under the limiting effect of the needle depth control unit, the needle 333 can always be kept in an appropriate extension range, and the depth of the extended needle 333 inserted into the human body is within a suitable range, and will not cause severe pain and damage to the human body.

Specifically, referring to FIG. 22, the needle depth control unit includes a limit block 3327, a limit driver 3328 and a measuring ruler 3329. The measuring ruler 3329 here has the same structure as the electronic ruler 3238 described above, and both are electric and can display numerical values. The measuring ruler 3329 is fixed on the outer end surface of the second sliding seat body 3323; and in order to reasonably plan the space and improve the space utilization, the measuring ruler 3329 is specifically fixed between two slide grooves 3233*a* on the outer end surface of one side of the second sliding seat body 3323. The limit driver 3328 is installed and fixed between the two slide grooves 3233*a* on the outer end surface of the other side of the second sliding seat body 3323, that is, the limit driver 3328 and the measuring ruler 3329 are respectively fixed on the two outer sides of the second sliding seat body 3323. The two ends of the limit block 3327 are fixedly installed with the limit driver 3328 and the measuring ruler 3329 respectively; specifically, one end of the limit block 3327 is fixed with the measuring axis of the measuring ruler 3329; the other end of the limit block 3327 is fixed with the output axis of the limit driver 3328. At the same time, a limit hole is set in the middle position of the limit block 3327, and the telescopic axis of the second needle pusher 3325 passes through the limit hole here; a stopper 3325*a* is fixedly installed on the telescopic axis of the second needle pusher 3325; the stopper 3325*a* cannot pass through the limit hole here.

The specific movement principle is: adjust the limit driver 3328 so that the output shaft of the limit driver 3328 can be extended and retracted within a reasonable range; when the output shaft of the limit driver 3328 is in an extended state, the position of the limit block 3327 has been positioned; the extension of the second needle pusher 3325 will carry the block to move synchronously, and when the block moves to conflict with the limit block 3327, the second needle pusher 3325 will not be able to continue to extend and move, that is, the extension length of the second needle pusher 3325 is limited by the limit block 3327 here, so that the second needle pusher 3325 can always maintain the extension and retraction movement within a reasonable range, thereby ensuring that the needle 333 is pushed out to a reasonable depth.

Because one end of the limit block 3327 is fixed to the measuring axis of the measuring ruler 3329, the position distance of the limit driver 3328 is collected and measured by the measuring ruler 3329. As long as the limit driver 3328 pushes out the limit block 3327, the limit block 3327 will pull the measuring axis of the measuring ruler 3329 outward, and the extended length of the measuring axis will be displayed on the measuring ruler 3329. The displayed value is also the active range distance of the second needle pusher 3325.

Optionally, the first needle pusher 3324 and the second pusher 3325 can be electric or pneumatic, which can be selected according to actual conditions.

In the present solution, the needle insertion module also includes a needle reserve component 334, in which a plurality of needles 333 are pre-reserved. Each time a patient is replaced, the needle reserve component 334 will provide a new needle 333 for the needle push rod 3326 to push out and insert into the patient's body. By pre-storing more needles 333 in the needle reserve component 334, medical staff can avoid constantly replacing needles 333, which is beneficial to improving the treatment efficiency of patients.

Specifically, referring to FIGS. 23 to 28, the needle storage component 334 has a needle storage rotating wheel 3341, and the needle storage rotating wheel 3341 has multiple needle storage cavities 3341-1, each of which accommodates a needle 333. Each extension and retraction action of the needle push rod 3326 in the acupuncture propulsion component 332 will cause the needle storage rotating wheel 3341 to rotate. Each time the needle storage rotating wheel 3341 rotates, a new needle 333 will correspond to the needle push rod 3326. In this way, each extension action of the needle push rod 3326 will push the needles 333 in different needle storage cavities 3341-1 into the human body.

Figure 23:
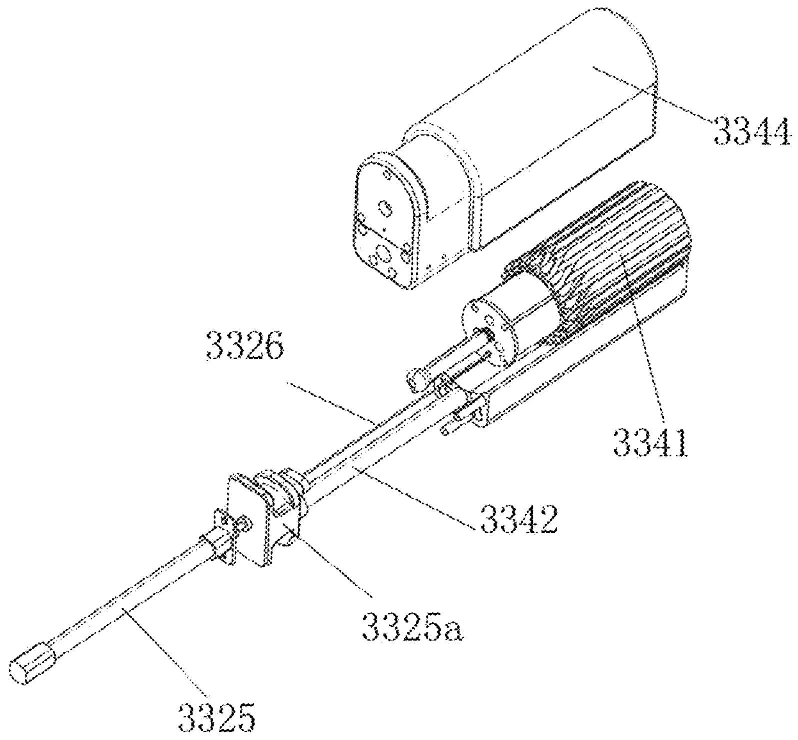
FIG. 23 is a three-dimensional view of the coordination of the second propulsion part of the needle and the needle storage component.
Figure 24:
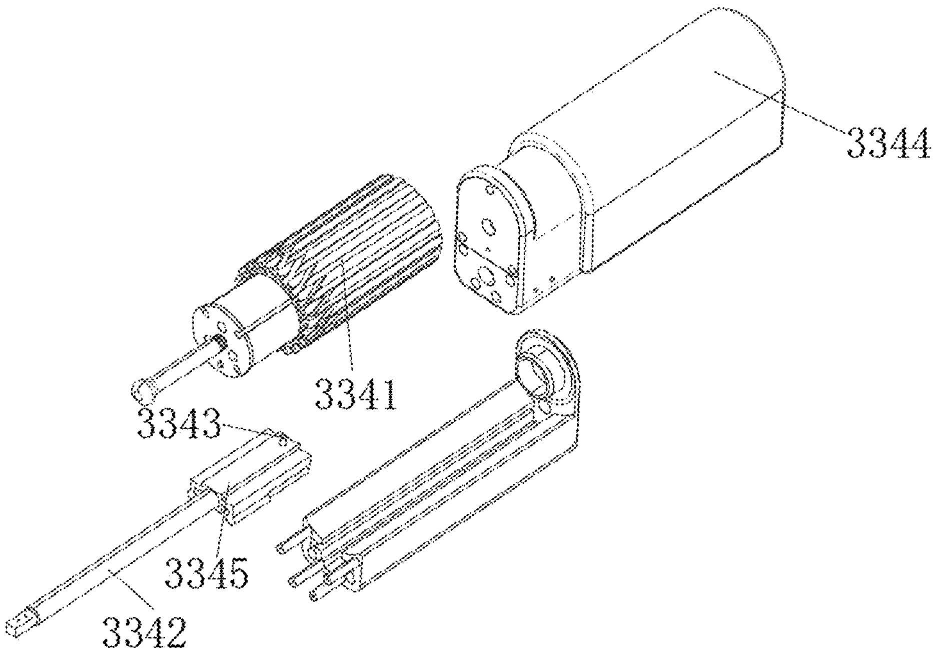
FIG. 24 is an exploded structural view of the needle storage component.
Figure 25:
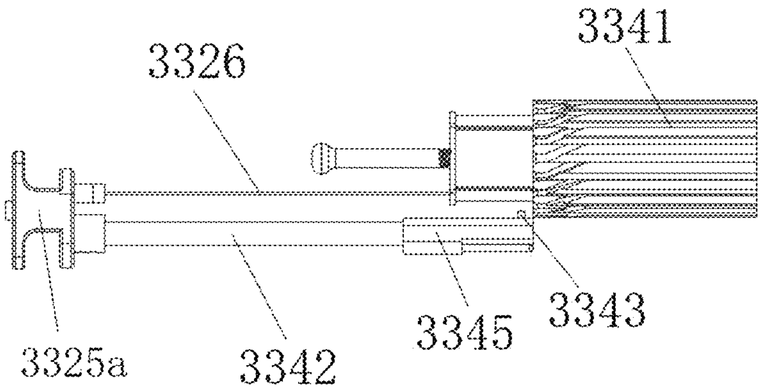
FIG. 25 is a structural view of the coordination of the needle push rod and the needle storage rotating wheel.

In this solution, referring to FIGS. 23 to 25, the rotation of the needle storage rotating wheel 3341 is synchronized with the extension of the needle push rod 3326. Specifically, a toggle body 3342 is fixed at the output end of the second needle pusher 3325. The toggle body 3342 is parallel and side by side with the needle push rod 3326. The toggle body 3342 extends along to the bottom of the needle storage rotating wheel 3341. A pin 3343 is also provided on the toggle body 3342, and the pin 3343 can toggle the needle storage rotating wheel 3341; that is, every time the second needle pusher 3325 is extended, the pin 3343 will toggle the needle storage rotating wheel 3341 here, so that different needles 333 in the needle storage rotating wheel 3341 correspond to the needle push rod 3326.

In the present embodiment, the needle reserve component 334 also includes a box body 3344, and the second sliding seat body 3323 has an outer shell extending outward; the box body 3344 is fixedly connected to the outer shell here; the needle storage rotating wheel 3341 is rotatably arranged in the box body 3344; a slider 3345 is arranged at the distal end of the toggle body 3342, and the pin 3343 is elastically connected to the upper end surface of the slider 3345, and the slider 3345 can slide back and forth in a straight line in the base of the box body 3344; by arranging the slider 3345, the stability of the linear sliding of the pin 3343 can be guaranteed, ensuring that the needle storage rotating wheel 3341 can be rotated every time.

In order to facilitate understanding of the specific rotation principle of the needle storage rotating wheel 3341, the needle storage rotating wheel 3341 is introduced in detail. It is not difficult to see that the structure of the needle storage rotating wheel 3341 and the cotton swab storage rotating wheel 3251 are very similar in general, and the control principle is almost the same.

Figure 26:
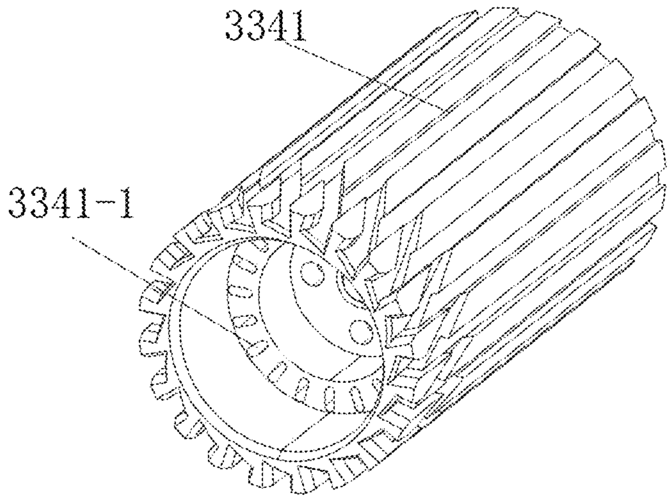
FIG. 26 is a planar structural view of the needle storage rotating wheel from the side view direction.
Figure 27:
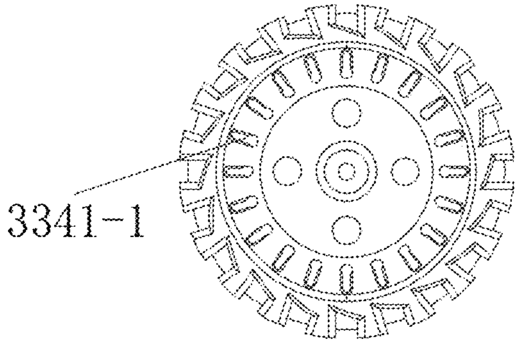
FIG. 27 is a planar structure view of the needle storage rotating wheel from a front view.
Figure 28:
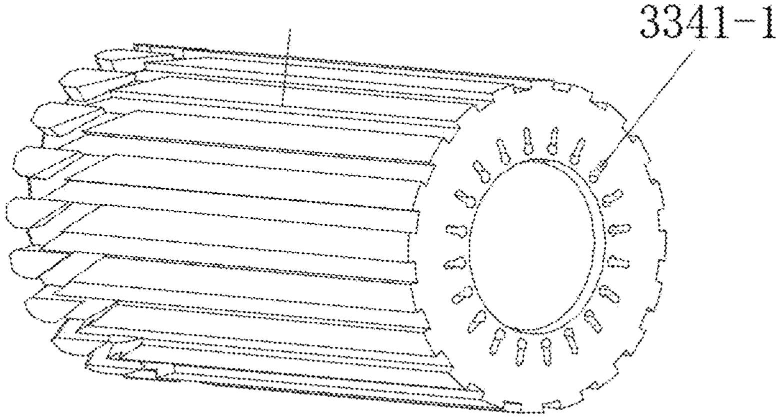
FIG. 28 is planar structure view of the needle storage rotating wheel from a rear view.

Specifically, referring to FIGS. 26 to 28, the needle storage rotating wheel 3341 includes two parts, including an outer cylindrical part and an inner cylindrical part which are coaxially arranged, and the inner cylindrical part is embedded and fixed in the outer cylindrical part; the needle storage cavity 3341-1 mentioned above passes through the inner cylindrical part here in a ring-shaped arrangement; the outer arc surface of the outer cylindrical part has a first guide slide and a second guide slide; wherein the first guide slide extends along the axial direction of the outer cylindrical part, and the starting end of the first guide slide is located at one end face of the outer cylindrical part and extends all the way to the other end face; the starting end of the second guide slide coincides with the starting end of the first guide slide, but the second guide slide is arranged at an angle until it is connected with the adjacent first guide slide.

Each time the pin 3343 is extended, it will enter from the second guide slideway, gradually turn the needle storage rotating wheel 3341 to rotate, until it enters the first guide slideway; then the pin 3343 will retreat, and this cycle will repeat. The specific movement path of the pin 3343 can refer to the movement path (a→b→c→d) of the toggle column 3253 mentioned above. After each section of the path, the needle storage rotating wheel 3341 will rotate a little, so that the adjacent needle storage cavity 3341-1 rotates to correspond to the needle push rod 3326.

Of course, in order to ensure the correct extension and retraction movement path of the pin 3343 each time, the depth of the starting end of the second guide slide is designed to be H1, and the depth of the first guide slide is H2, H1>H2; at the same time, because the second guide slide and the first guide slide have a connection; the depth of the connection is H3, H1>H2>H3. It can be understood that the depth of the second guide slide gradually decreases, the depth of the starting end of the second guide slide is H1, and the depth of the end of the second guide slide is H3 (equivalent to the connection with the first guide slide); through such a design, the pin 3343 can enter from the starting end of the second guide slide each time it is extended, and the driving force will drive the needle storage rotating wheel 3341 to rotate until it passes through the above connection and enters the first guide slide. At this time, the needle storage rotating wheel 3341 rotates to the right position, and the pin 3343 retreats along the first guide slide to wait for the next drive.

The structures of the needle storage rotating wheel 3341 and the cotton swab storage rotating wheel 3251 are very similar in general, and the control principles are almost the same, but there are also differences. The specific differences include two points.

First, the structures of the needle storage cavity 3341-1 and the cotton swab storage cavity 3251-1 are different; in the cotton swab storage rotating wheel 3251, the shape of the cotton swab storage cavity 3251-1 is adapted to the cylindrical cotton swab, that is, the cotton swab storage cavity 3251-1 is a cylindrical cavity; however, the acupuncture needle is different from the cotton swab. The cotton swab can only be used to wipe the skin for disinfection, but the acupuncture needle needs to be inserted into the patient's acupuncture point more accurately, so the needle removal accuracy needs to be guaranteed.

Figure 29:
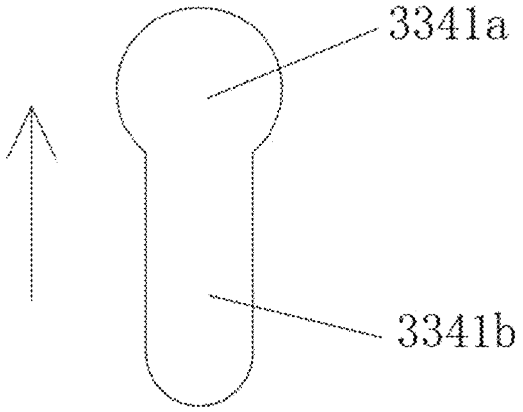
FIG. 29 is a planar structure view of the needle storage chamber.
Figure 30:
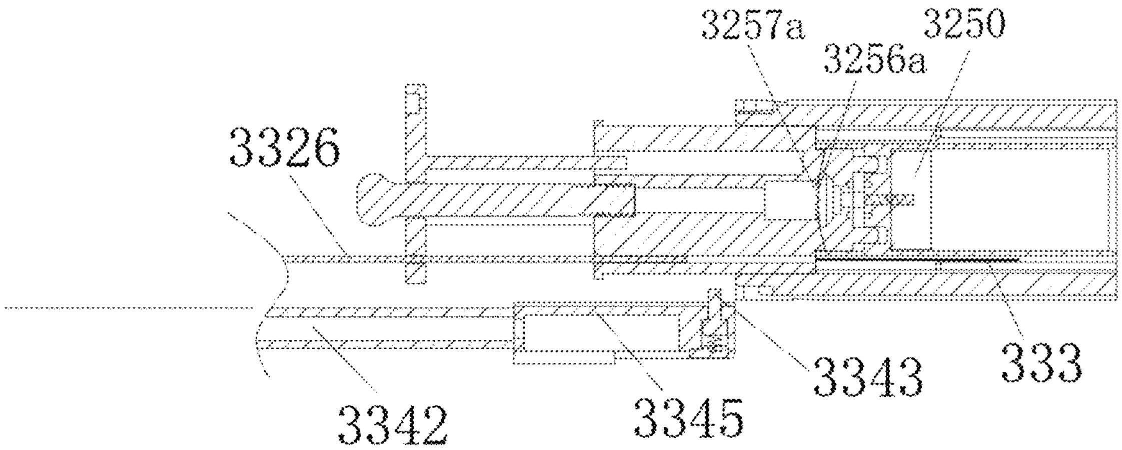
FIG. 30 is a cross-sectional view at the needle storage rotating wheel.

Specifically, the needle storage chamber 3341-1 is composed of two parts, see FIGS. 29-30, including a cylindrical first chamber 3341*a* and a long strip shaped second chamber 3341*b*; the first chamber 3341*a* is connected to the second chamber 3341*b*, and when the needle storage chamber 3341-1 is at the lowest position, the first chamber 3341*a* is located above the second chamber 3341*b*, and the cross-sectional shape of the first chamber 3341*a* and the second chamber 3341*b* connected is mushroom-shaped. The size of the first chamber 3341*a* is relatively loose, greater than the outer dimensions of the needle, so that the needle can be pushed out very easily, and the size of the second chamber is only slightly larger than the outer dimensions of a needle, and can also be the same as the size of the needle. The needles can be arranged smoothly in the second chamber without large deviations.

The needles are put into the needle storage chamber 3341-1, and generally three needles are first placed in the second chamber 3341*b* for temporary storage; during the rotation of the needle storage rotating wheel 3341, one of the needles gradually enters the first chamber 3341*a* from the second chamber 3341*b*, and is finally pushed out by the needle push rod 3326. This design can improve the accuracy of needle removal and ensure that the needles are removed one by one each time.

Second: in this solution, in order to ensure that the needle storage rotating wheel 3341 does not deflect after each rotation, a rotation limiting structure is also provided. The rotation limiting structure is exactly the same as the rotation limiting structure in the cotton swab storage rotating wheel described above, and the working principle is also the same, so the working principle will not be described here.

However, in order to ensure that the needles can stably enter the first chamber 3341*a* from the second chamber 3341*b*, we have inserted a magnet in the mounting seat here; this is because in this solution, at least three needles are arranged in the second chamber 3341*b*, in order to ensure that the needles in the first chamber can be stable during the rotation of the needle storage rotating wheel 3341; a magnet is fixedly installed in the mounting seat, and the magnet provides suction, so that the needles in the second chamber 3341*b* gather one by one toward the center of the first chamber 3341*a*, so that the needles in the first chamber 3341*a* are ejected under the ejection action of the needle push rod 3326.

By adopting the above structural design, when treating patients, under the operation of intelligent control, the patient is first wiped and disinfected with a cotton swab, and then the acupuncture needle (treatment needle) is pushed out and steadily inserted into the treatment area of the patient; the next step is to rotate the acupuncture needle for treatment.

Figure 31:
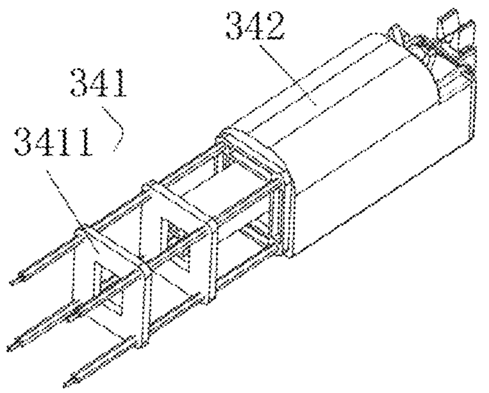
FIG. 31 is a three-dimensional view of the needle twisting module.

Rotating the needle may be referred to as needle rotation or needle twisting; the specific action is achieved by the needle twisting module 340 herein. Referring to FIGS. 6 and 31, the needle twisting module 340 is located at the outermost side of the three side-by-side modules and is the last module to perform action among all modules; the needle twisting module 340 includes a third support component 341, an alignment propulsion component 342 and a rotation clamping component 343; the coordination relationship between them is that the third support component 341 is also fixed on the end face of the bracket plate 313, the alignment propulsion component 342 is fixed on the third support component 341, and the rotation clamping component 343 is fixed on the alignment propulsion component 342 here.

Specifically, the third support component 341 has a third support frame 3411, which is composed of four support rods and fixed in the bracket plate 313; the third support component 341 mainly plays a supporting role; the main function of the alignment propulsion component 342 is to push out or retract the rotating clamping component 343 in a straight line, so that the rotating clamping component 343 can be closer to the needle on the human body; the main purpose of the rotating clamping component 343 is to clamp the needle and rotate it, thereby achieving the purpose of imitating artificial needle twisting. That is, the alignment propulsion component 342 drives the rotating clamping component 343 to extend straight to the preset position, and then the rotating clamping component 343 clamps the needle and rotates it.

Figure 32:
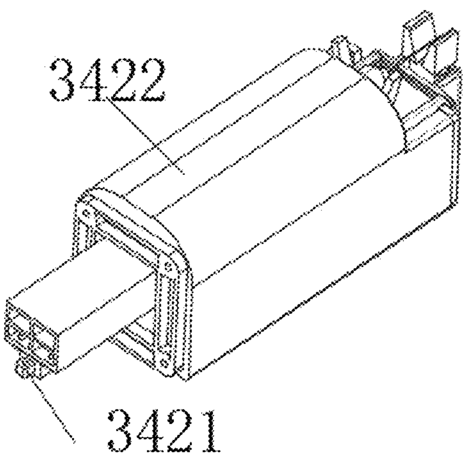
FIG. 32 is a three-dimensional diagram of the alignment propulsion component.
Figure 33:
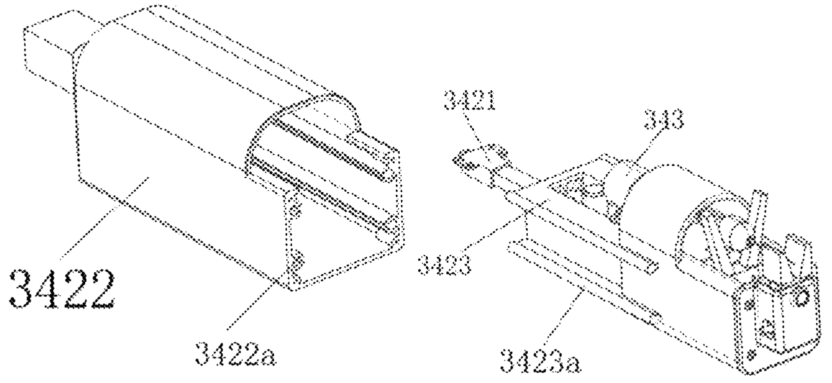
FIG. 33 is a split structure view of the alignment propulsion component.
Figure 34:
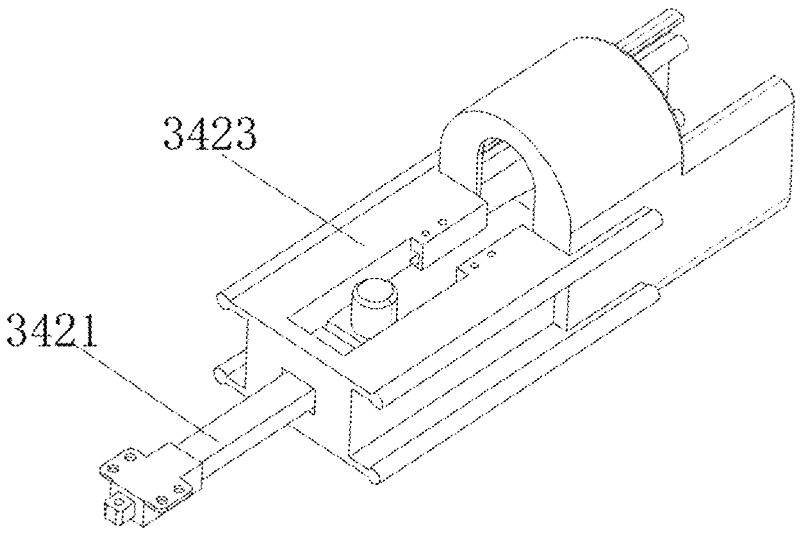
FIG. 34 is a structure view of the third sliding seat body in the alignment propulsion component.

Referring to FIG. 32 to FIG. 34, the structure of the alignment propulsion component 342 includes a first linear propulsion source 3421, a third housing 3422 and a third sliding seat body 3423; wherein the third housing 3422 is fixed to the third support component 341 through a fastening plate, and a slide groove 3422*a* is provided inside the third housing 3422; a slide rail 3423*a* is provided on the outer surface of the third sliding seat body 3423, and the third sliding seat body 3423 can slide relative to the third housing 3422 through the cooperation between the slide rail and the slide groove 3422*a*; of course, the relative sliding here is driven by the first linear propulsion source 3421, one end of the first linear propulsion source 3421 is fixed to the fastening plate, and the other end penetrates into the third housing 3422 and is fixed to the third sliding seat body 3423. In this way, as long as the first linear propulsion source 3421 is in motion, the third sliding seat body 3423 can slide linearly relative to the third housing 3422.

The first linear propulsion source 3421 here can be a common driving element such as a cylinder, an electric cylinder or a linear motor.

The rotating clamping component 343 is fixed on the third sliding seat body 3423, so the movement of the third sliding seat body 3423 will inevitably bring the rotating clamping component 343 to move synchronously, thereby realizing that the rotating clamping component 343 is close to the acupuncture needle or away from the acupuncture needle.

Figure 35:
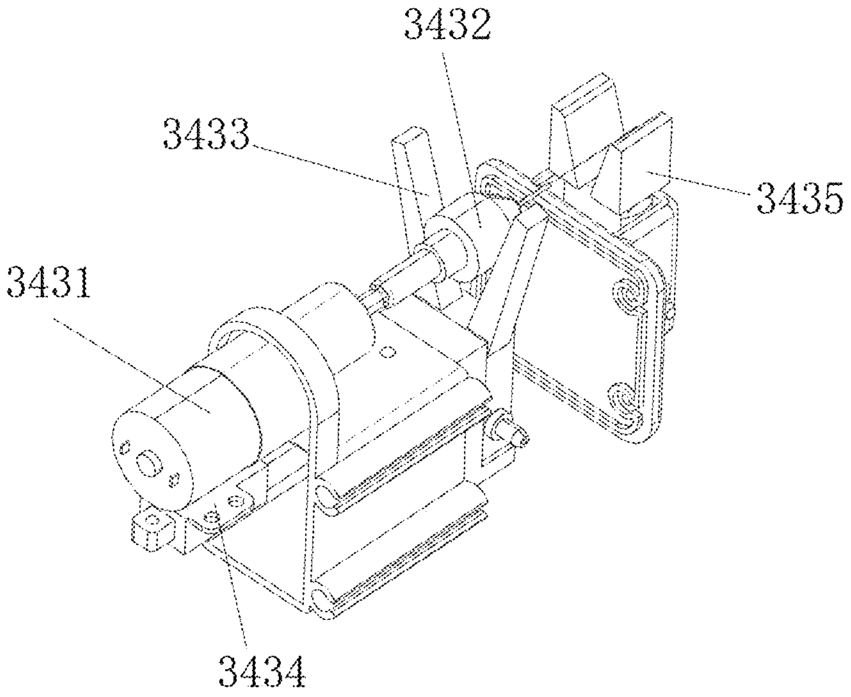
FIG. 35 is a three-dimensional structure view of the rotating clamping component.

Specifically, referring to FIGS. 33 and 35, the rotating clamping component 343 includes a stabilizing clamping portion, a rotating tightening portion and a rotating motor 3431; wherein the rotating motor 3431 is fixedly connected to the front of the positioning propulsion component 342, specifically, the rotating motor 3431 is fixed on the third sliding seat body 3423, and the rotating tightening portion 3432 is fixedly connected to the output shaft of the rotating motor 3431; the rotating tightening portion 3432 here is similar to the structure of a three-claw chuck, and a first clamping member 3433 is provided below the rotating tightening portion 3432, and the first clamping member first clamps the rotating tightening portion 3432 here, and under the rotation of the rotating motor 3431, the rotating tightening portion 3432 will be tightened, and then the first clamping member 3433 is loosened, so that the rotating motor 3431 can rotate with the rotating tightening portion 3432 in the tightened state. The rotating and tightening part 3432 is mainly used to clamp and tighten the needle, and then rotate the needle (twisting the needle) under the action of the rotating motor 3431.

Optionally, a second linear propulsion source 3434 is further included, which is fixed on the third sliding seat body 3423, and the rotating motor 3431 described above is fixed on the second linear propulsion source 3434. The second linear propulsion source 3434 can make the rotating tightening part 3432 closer to the stabilizing clamping part 3435.

The stabilizing clamping portion 3435 here is arranged in front of the rotating tightening portion 3432; it is specifically fixed on the front most end face of the third sliding seat body 3423. The stabilizing clamping portion 3435 is specifically a second clamping member. The second clamping member here is mainly used to clamp the acupuncture needle on the human body before the rotating tightening portion 3432 tightens the acupuncture needle, so that the rotating tightening portion 3432 can clamp the acupuncture needle more smoothly and stably.

The specific working principle is: the first linear propulsion source 3421 works first, pushing the third sliding seat body 3423 relative to the third shell body 3422, so that the stabilizing clamping part 3435 (second clamping member) fixed at the farthest end of the third sliding seat body 3423 is close to the patient; then the stabilizing clamping part 3435 moves to clamp the needle on the patient's body, thereby playing a role of pre-stabilization. Then the second linear propulsion source 3434 starts working again, driving the rotating motor 3431, the rotating tightening part 3432 and the first clamping member 3433 to gradually approach the stabilizing clamping part 3435, until the tail end of the needle is in the rotating tightening part 3432. At this time, the first clamping member 3433 clamps the rotating tightening part 3432 again, and the rotating motor 3431 starts to drive the rotating tightening part 3432 to gradually clamp the needle and put it in a tightened state; then, the first clamping member 3433 is loosened, and the second clamping piece is also loosened; the rotating motor 3431 will realize the rotation with the needle to achieve the purpose of twisting the needle.

After the acupuncture is completed by the needle twisting module 340, the second linear propulsion source 3434 retreats, so that the rotating tightening part 3432 carries the needle and pulls the needle out of the human body; then, the first clamping member clamps the rotating tightening part 3432 again, and the rotating motor 3431 rotates in the opposite direction, so that the rotating tightening part 3432 loosens the needle. The needle will be collected in the storage box 314.

At this point, the principle of acupuncture treatment for patients using the remote collaborative robot acupuncture system of this solution has been introduced.

In this solution, the multi-axis robotic arm can be operated synchronously by remote control with the cooperation of the monitoring module, by controlling the teaching pendant to move close to or away from the human body; then the controller controls the acupuncture operation group to complete the acupuncture operation on the human body. The cotton ball disinfection, treatment needle insertion and needle twisting required during the acupuncture process are completed in sequence through the structure of the acupuncture operation group, realizing the practical application of intelligence, which has a great guarantee effect on reducing the labor intensity of medical personnel, improving the efficiency of acupuncture treatment, and improving the insertion accuracy of treatment needles.

The above description is only a preferred embodiment of the present invention and is not intended to limit the present invention. Any modifications, equivalent substitutions, improvements, etc. made within the spirit and principle of the present invention should be included in the protection scope of the present invention.

What is claimed is:

1. A remote collaborative robot acupuncture system, comprising:

an acupuncture robot configured for performing acupuncture operations; and a remote operation terminal configured for remote control, the remote operation terminal and the acupuncture robot being connected through a network;

wherein the acupuncture robot comprises a multi-axis robotic arm (100), a monitoring module (200) and an acupuncture operation group (300); the monitoring module (200) and the acupuncture operation group (300) are both installed on the multi-axis robotic arm (100), the multi-axial robotic arm (100) operates the acupuncture operation group (300) to move to an acupuncture site of the human body, and the monitoring module (200) is configured to capture images and monitor in real time; and wherein the remote operation terminal comprises a teaching pendant, a display and a controller, the teaching pendant has a same structure as the multi-axis robotic arm (100), the teaching pendant is operated under a network connection state, the multi-axis robotic arm (100) follows the teaching pendant; the display is configured to display images captured by the monitoring module (200), and the controller is configured to operate the acupuncture operation group (300);

wherein the acupuncture operation group (300) includes a bracket module (310), a disinfection module (320), a needle insertion module (330) and a needle twisting module (340); the bracket module (310) is fixed on the distal end of multi-axis robotic arm (100); the disinfection module (320), the needle insertion module (330) and needle twisting module (340) are fixed side by side on the bracket module (310) in sequence; the multi-axis robotic arm (100) drives the bracket module (310), thereby causing the disinfection module (320), the needle insertion module (330) and the needle twisting module (340) to be adjusted in space;

wherein the bracket module (310) comprises a fixed plate (311), a linear motor module (312) and a bracket plate (313); the fixed plate (311) is connected to the distal end of the multi-axis robotic arm (100); the linear motor module (312) is fixed on the end surface of the fixed plate (311) away from the multi-axis robotic arm (100), and the bracket plate (313) is fixed on a slider (**312*b*) of the linear motor module (312); the motor (312*a*) in the linear motor module (312) drives the slider (312*b***) to slide left and right in a straight line;

wherein the disinfection module (320), needle insertion module (330) and needle twisting module (340) are all fixed on the end surface of the bracket plate (313) away from the linear motor module (312);

wherein the disinfection module (320) comprises an eccentric drive component (322), a disinfection propulsion component (323) and a cotton swab storage component;

the eccentric drive component (322) is fixed on the bracket plate (313) through a first support frame (3211);

the disinfection propulsion component (323) is fixed on the eccentric drive component (322); the cotton swab (324) is built into a swab storage component, and the cotton swab (324) is arranged in front of the disinfection propulsion component (323); and the disinfection propulsion component (323) drives the cotton swab (324) to extend straightly to contact an area of the human body to be acupuncture, and the eccentric drive component (322) is configured to drive the disinfection propulsion component (323), the cotton swab reserve component rotates eccentrically to disinfect an acupuncture area of the human body.

2. The remote collaborative robot acupuncture system according to claim 1, wherein the cotton swab storage component comprises a cotton swab storage runner (3251), the cotton swab storage runner (3251) has multiple cotton swab storage cavities (3251-1), each of the cotton swab storage cavities (3251-1) 3251-1) contains a cotton swab (324);

the disinfection propulsion component (323) has a telescopic cotton swab push rod (3236), each extension action of the cotton swab push rod (3236) pushes the cotton swabs (324) in different cotton swab storage chambers (3251-1) out until the cotton swabs (324) contacts an acupuncture area on the human body.

3. The remote collaborative robot acupuncture system according to claim 1, wherein the needle insertion module (330) comprises a second support component (331), an acupuncture advancement component (332) and a needle (333);

the second support component (331) comprises a second support frame (3311), the second support frame (3311) is fixed on the support plate (313), and the acupuncture propulsion component (332) is installed on the second support component (331); the needle (333) is arranged in front of the acupuncture propulsion component (332);

wherein the acupuncture propulsion component (332) drives the needle (333) to extend straightly to penetrate the acupuncture site of the human body.

4. The remote collaborative robot acupuncture system according to claim 3, wherein the needle insertion module (330) further comprises a needle storage rotating wheel (3341), the needle storage rotating wheel (3341) has multiple needle storage cavities (3341-1), and each needle storage cavity (3341-1) 1) has a needle (333) housed therein;

the acupuncture propulsion component (332) comprises a telescopic needle push rod (3326), each extension movement of the needle push rod (3326) pushes out the needle (333) in different needle storage chambers (3341-1) to penetrate into the human body.

5. The remote collaborative robot acupuncture system according to claim 1, wherein the needle twisting module (340) comprises a third support component (341), an alignment propulsion component (342) and a rotation clamping component (343);

the third support component (341) comprises a third support frame (3411), the third support frame (3411) is fixed on the support plate (313), and the alignment propulsion component (342) is installed on the third support component (341), the rotation clamping component (343) is connected in front of the alignment propulsion component (342);

the alignment pushing component (342) drives the rotating clamping component (343) to linearly extend to a preset position, and the rotating clamping component (343) clamps and rotates the needle (333).

6. The remote collaborative robot acupuncture system according to claim 5, wherein the rotation clamping component (343) comprises a stabilizing clamping part (3435), a rotation tightening part (3432) and a rotation motor (3431);

the rotating motor (3431) is fixedly connected in front of the alignment propulsion component (342), and the rotating tightening part (3432) is fixedly connected to the output shaft of the rotating motor (3431); the stabilizing clamping part (3435) is provided in front of the rotating tightening part (3432);

the stabilizing clamping part (3435) is configured to initially clamp the needle located on the human body; the alignment propulsion component (342) drives the rotating tightening part (3432) to advance linearly, and rotates when the rotating motor (3431) drives the rotating tightening part (3432) to clamp the needle (333); after the stabilizing clamping part (3435) loosens the needle (333), the rotating motor (3431) drives the needle (333), rotate the tightening part (3432) and continue to rotate to achieve the needle twisting operation.

7. The remote collaborative robot acupuncture system according to claim 1, wherein the monitoring module (200) comprises a first monitor (210) and a second monitor (220); the first monitor (210) is installed on the multi-axis robotic arm (100), and the third monitor (210) is installed on the multi-axis robotic arm (100), a monitor (210) is configured to monitor the motion state of the acupuncture operation group (300); the second monitor (220) is installed on the acupuncture operation group (300), and the second monitor (220) is installed on the acupuncture operation group (300), and the second monitor 220 is configured to grasp image of the acupuncture site on the human body.

* * * * *